US011338206B2

(12) United States Patent
Sensui et al.

(10) Patent No.: US 11,338,206 B2
(45) Date of Patent: May 24, 2022

(54) INFORMATION PROCESSING SYSTEM, INFORMATION PROCESSING APPARATUS, COMPUTER-READABLE NON-TRANSITORY STORAGE MEDIUM HAVING INFORMATION PROCESSING PROGRAM STORED THEREIN, AND INFORMATION PROCESSING METHOD

(71) Applicant: NINTENDO CO., LTD., Kyoto (JP)

(72) Inventors: Kazuyoshi Sensui, Kyoto (JP); Masaki Yasuhara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 58 days.

(21) Appl. No.: 17/004,089

(22) Filed: Aug. 27, 2020

(65) Prior Publication Data
US 2021/0069594 A1 Mar. 11, 2021

(30) Foreign Application Priority Data
Sep. 6, 2019 (JP) .............................. JP2019-163373

(51) Int. Cl.
*A63F 13/00* (2014.01)
*A63F 13/69* (2014.01)
*G06F 3/04842* (2022.01)
*A63F 13/44* (2014.01)
*A63F 13/792* (2014.01)

(52) U.S. Cl.
CPC .............. *A63F 13/69* (2014.09); *A63F 13/44* (2014.09); *A63F 13/792* (2014.09); *G06F 3/04842* (2013.01)

(58) Field of Classification Search
CPC ............. G07F 17/3239; G07F 17/3272; G07F 17/3274
See application file for complete search history.

(56) References Cited

U.S. PATENT DOCUMENTS

| 2013/0185220 A1* | 7/2013 | Good | G06Q 50/01 705/329 |
| 2014/0358672 A1* | 12/2014 | Sim | G06Q 30/0246 705/14.45 |
| 2014/0358673 A1* | 12/2014 | Sim | G06Q 30/0273 705/14.45 |

FOREIGN PATENT DOCUMENTS

JP 2018-166679 11/2018

\* cited by examiner

*Primary Examiner* — Omkar A Deodhar
*Assistant Examiner* — Eric M Thomas
(74) *Attorney, Agent, or Firm* — Nixon & Vanderhye P.C.

(57) ABSTRACT

A plurality of content groups are stored in a memory, and some of the content groups are determined as selectable target groups by a selection. One content group is selected from among the selectable target groups on the basis of a user's operation, and a selection process is executed for the one content group. A content selected is given to the user, and a given status of each content is stored in the memory such that this given content is excluded. In addition, when a predetermined condition is satisfied, selectable target groups are selected again. At this time, the given status of each content in each content group is retained regardless of which content groups are set as the selectable target groups.

13 Claims, 23 Drawing Sheets

| CONTENT ID | CONTENT DETAILS DATA | RARITY INFORMATION |
|---|---|---|
| 0100 | .... | .... |
| 0101 | .... | .... |
| 0102 | .... | .... |
| ⋮ | ⋮ | ⋮ |

Fig. 14

| ISLAND ID | SELECTION TARGET CONTENT INFORMATION | SELECTION TABLE | GIVEN STATUS INFORMATION | COMPLETION ITEM INFORMATION | DEPARTURE CONDITION INFORMATION | WAITING TIME INFORMATION |
|---|---|---|---|---|---|---|
| 010 | ... | ... | ... | ... | ... | hh:mm:ss |
| 011 | ... | ... | ... | ... | ... | hh:mm:ss |
| 012 | ... | ... | ... | ... | ... | hh:mm:ss |
| 013 | ... | ... | ... | ... | ... | hh:mm:ss |
| ... | ... | ... | ... | ... | ... | ... |

| SHIP ID | CURRENT STATE INFORMATION | SAILING DESTINATION INFORMATION | DEPARTURE START TIME | SELECTION RESULT INFORMATION |
|---|---|---|---|---|
| 01 | MIDDLE OF SAILING | xxxx | yyyy/mm/dd hh:mm:ss | xxxx |
| 02 | ALREADY RETURNED TO PORT | xxxx | yyyy/mm/dd hh:mm:ss | xxxx |
| 03 | MIDDLE OF SAILING | xxxx | yyyy/mm/dd hh:mm:ss | xxxx |
| 04 | FREE | | | |
| 05 | ALREADY RETURNED TO PORT | xxxx | yyyy/mm/dd hh:mm:ss | xxxx |

INFORMATION PROCESSING SYSTEM, INFORMATION PROCESSING APPARATUS, COMPUTER-READABLE NON-TRANSITORY STORAGE MEDIUM HAVING INFORMATION PROCESSING PROGRAM STORED THEREIN, AND INFORMATION PROCESSING METHOD

CROSS REFERENCE TO RELATED APPLICATION

The disclosure of Japanese Patent Application No. 2019-163373, filed on Sep. 6, 2019, is incorporated herein by reference.

FIELD

The exemplary embodiments relate to information processing for giving a content used in a predetermined application to a user through a selection.

BACKGROUND AND SUMMARY

Hitherto, game processing for giving a content such as a predetermined in-game item to a user through a selection has been known.

In the above game, assuming that the selection is provided for a predetermined period, if the user cannot acquire the desired content through the selection until the end of the predetermined period, the chance for the user to acquire the desired content is lost. In this regard, there is room for improvement in terms of ensuring the chance for a user to acquire a content.

Therefore, it is an object of the exemplary embodiments to provide an information processing system, an information processing method, a computer-readable non-transitory storage medium having an information processing program stored therein, and an information processing apparatus that can ensure the chances for a user to acquire a content through a selection.

In order to attain the object described above, for example, the following configuration examples are exemplified.

A configuration example is directed to a processing system including at least one processor, the at least one processor included in the processing system singly or in cooperation executing: storing, in a memory, a plurality of content groups and a limited number of contents that are to be selection targets for each of the content groups; determining some of the plurality of content groups stored in the memory as selectable target groups by a first selection; selecting at least one content group from among the selectable target groups on the basis of a user's operation; executing a second selection for the contents that are to be the selection targets for the selected content group, on the basis of a user's operation; giving a selected content determined by the second selection to the user; storing, in the memory, a given status of each content in the content group for which the second selection is executed, such that the given selected content is excluded from the selection targets in the content group; determining some of the plurality of content groups as the selectable target groups by the first selection again when a predetermined condition is satisfied; and retaining, in the memory, the given status of each content in each content group regardless of which content groups are determined as the selectable target groups by the first selection.

According to the above configuration example, the content group included in the selectable target groups that are selectable by the user can be changed while the given status of each content is retained, on condition that a predetermined condition is satisfied. At this time, after the content group that has been selectable by the user is excluded from the selectable target groups, the content group may be included in the selectable target groups again. In this case as well, it is possible to allow the user to continue the selection with adoption of the previous selected/unselected status of the content group. Accordingly, the chance for the user to acquire the content can be ensured.

In another configuration example, when a predetermined user's operation is performed after a predetermined period elapses from previous determination of the selectable target groups, it may be determined that the predetermined condition is satisfied, and the selectable target groups may be determined from among the plurality of content groups.

According to the above configuration example, with an elapse of the predetermined period as a condition, re-determination of the selectable target groups can be performed. Accordingly, the chance of acquiring the content can be ensured at least during the predetermined period, and the chances of acquiring the contents in various content groups can also be provided to the user by the re-determination.

In another configuration example, until the predetermined user's operation is performed, determination of the selectable target groups from among the plurality of content groups may not be performed again.

According to the above configuration example, unless a manual operation is performed by the user, the contents of the selectable target groups can be made unchanged. Accordingly, until the user acquires the desired content, the selectable target groups can be made unchanged, and the chance for the user to acquire the desired content can be ensured.

In another configuration example, after an elapse of a predetermined period from previous determination of the selectable target groups as the predetermined condition, the plurality of content groups may be determined as the selectable target groups again regardless of presence/absence of a user's operation.

According to the above configuration example, the contents of the selectable target groups can be automatically changed, so that it is possible to allow the user to recognize that there are lotteries for various content groups.

In another configuration example, even when the predetermined condition is not satisfied but an additional condition different from the predetermined condition is satisfied, the selectable target groups may be determined again from among the plurality of content groups.

According to the above configuration example, a plurality of stepwise conditions can be set as conditions for performing re-determination of the selectable target groups. Accordingly, more chances of performing re-determination of the selectable target groups can be provided to the user.

In another configuration example, the additional condition may be consumption of predetermined virtual currency.

In another configuration example, when all the selection targets of at least one content group among the plurality of content groups are excluded, the given status of each content in the content group may be updated and stored in the memory such that at least a part of the contents excluded from the selection targets is set as a selection target again.

According to the above configuration examples, when the selection target contents are excluded, the selection target contents are added again, so that the user is allowed to repeatedly acquire the desired content.

In another configuration example, when all the selection targets of at least one content group among the plurality of content groups are excluded, the content group may be stored in the memory such that the content group is excluded from selection targets of the first selection.

According to the above configuration example, it is possible to provide a chance of giving according to a content to be given to the user, for example, in the case where it is desired to provide a content for which there is only one acquisition chance in addition to contents that can be acquired repeatedly.

In another configuration example, a content determined by the second selection may be given to the user after a predetermined waiting time elapses, and, even before the predetermined waiting time elapses, when the user consumes a predetermined item, the content determined by the second selection may be given to the user. Furthermore, execution of determination of the selectable target groups by the first selection again may be limited in a period from an instruction to execute the second selection for the content group to execution of the giving according to the instruction.

In another configuration example, after a predetermined waiting time elapses from an instruction to execute the second selection for the content group, a content determined by the second selection may be given to the user, and even before the predetermined waiting time elapses, when the user consumes a predetermined item, the content determined by the second selection may be given to the user.

According to the above configuration examples, while an elapse of the predetermined time period is required from a selection instruction to content giving, it is possible to immediately give a content on condition that a predetermined item is consumed, regardless of how much of the predetermined time period has elapsed. Accordingly, it is possible to provide the user with an option of using an item for immediate giving and an option of giving with item consumption being saved, so that the entertainment characteristics of the selection game can be enhanced.

According to the exemplary embodiments, the chances for the user to acquire the contents can be ensured, so that the entertainment characteristics of the selection game can be enhanced.

BRIEF DESCRIPTION OF THE DRAWINGS

FIG. 13 illustrates a non-limiting example of the data structure of a content database 502;

FIG. 14 illustrates a non-limiting example of the data structure of an island database 503;

FIG. 15 illustrates a non-limiting example of the structure of ship list data 505;

DETAILED DESCRIPTION OF NON-LIMITING EXAMPLE EMBODIMENTS

[Hardware Configuration of Information Processing Terminal]

Figure 1:
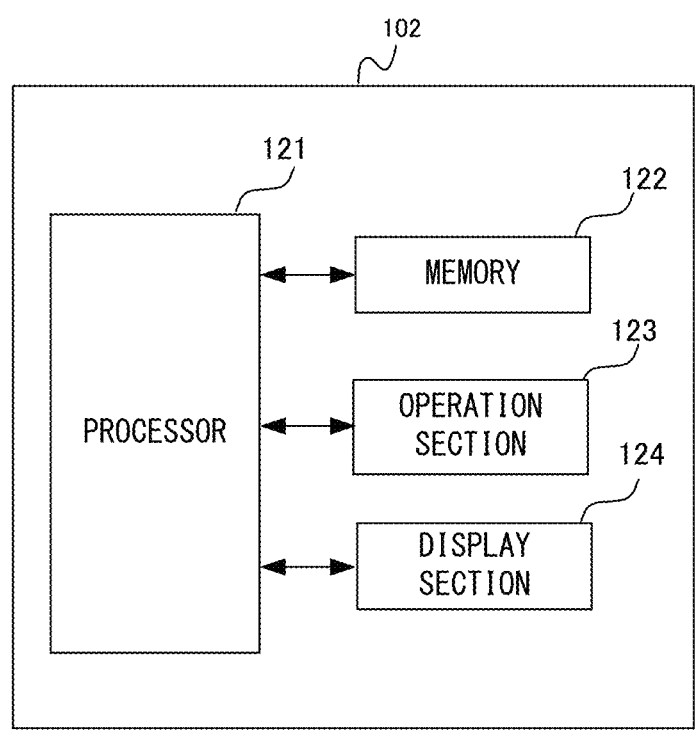
FIG. 1 is a block diagram showing a non-limiting example of the hardware configuration of an information processing terminal 102.

Hereinafter, one exemplary embodiment will be described. It is to be understood that, as used herein, elements and the like written in the singular form with the word "a" or "an" attached before them do not exclude those in the plural form. FIG. 1 is a block diagram showing the hardware configuration of an information processing terminal 102 in which information processing according to the exemplary embodiment is executed. Here, in the exemplary embodiment, for example, a smart device such as a smartphone and a tablet, a game apparatus such as a stationary game apparatus and a hand-held game apparatus, a personal computer, or the like is assumed as the information processing terminal 102. In the description of the exemplary embodiment, an information processing terminal (for example, a smartphone) including a display screen and a touch panel that are integrated with each other will be described as an example. Therefore, input operations are mainly inputs to the touch panel. However, in another exemplary embodiment, for input operation, a physical controller connected to an information processing terminal wirelessly or via wire may be employed, or for example, an input apparatus formed integrally with the information processing terminal may be employed. In addition, regarding the information processing terminal 102, in another exemplary embodiment, an information processing system including a plurality of information processing apparatuses may be employed. Processing described below may be divided and executed by the plurality of information processing apparatuses.

In FIG. 1, the information processing terminal 102 includes a processor 121, a memory 122, an operation section 123, and a display section 124. The processor 121 executes later-described game processing or executes a system program (not shown) for controlling overall operation of the information processing terminal 102, thereby controlling operation of the information processing terminal 102. The processor 121 may include a single processor or a plurality of processors. In the memory 122, various programs to be executed by the processor 121 and various kinds of data to be used in the programs are stored. The memory 122 is, for example, a flash EEPROM or a hard disk device. The operation section 123 is an input device for receiving an operation from a user, and a touch panel is mainly assumed as the operation section 15 in the exemplary embodiment. In another exemplary embodiment, the operation section 123 may be various pointing devices, various press-type buttons, an analog stick, and the like. The display section 124 is typically a liquid crystal display device.

[Outline of Information Processing (Game Processing) According to Exemplary Embodiment]

Next, the outline of information processing executed in the exemplary embodiment will be described. In the exemplary embodiment, application processing that allows a predetermined content to be acquired (given to a user) through a "selection" process is assumed. More specifically, processing of a game application (hereinafter, referred to as game processing) is assumed as an example of the application. In addition, an "in-game content" that can be used in the game is assumed as an example of a content that can be acquired by the user as a result of the selection process. As the "in-game content", for example, the following is assumed. First, examples of the "in-game content" include various items such as furniture articles, interior articles, and miscellaneous goods that can be arranged in a virtual game space (for example, a user's "home" in the game), and clothing items for decorating a user character, and material items for creating various items. In addition, characters and units to be operated by the user in the game are also assumed as examples of the "in-game content". The "in-game content" may be an item for acquiring a character or a unit. Moreover, weapons, protectors, and the like with which the characters, etc., can be equipped, and abilities such as magic and skills are also assumed as examples of the "in-game content". Furthermore, examples of the "in-game content" include various images that can be used as a main menu and a top page in the game, the background of a home screen, etc. Moreover, the "in-game content" may be virtual currency in the game.

In the exemplary embodiment, a plurality of lotteries through each of which the above in-game content can be acquired are prepared. That is, a set of in-game contents to be selection targets in a certain selection process is set as one "content group", and a plurality of such content groups are prepared. In the following description, each content group is referred to as a "selection target group". Some of the plurality of selection target groups are presented to the user. For example, in the case where ten selection target groups are prepared, five of these selection target groups can be presented to the user at one time. The user can select one from among the five selection target groups and perform a predetermined operation for a selection process. In addition, the selection target groups presented to the user can be changed on the basis of a user's operation. Specifically, by the user performing an operation for updating the presented content, a selection for determining selection target groups to be presented is performed. Accordingly, it is possible to change the selection target groups presented to the user from among the ten selection target groups. In the following description, such a selection for determining selection target groups to be presented is referred to as a "first selection".

In the exemplary embodiment, by the user satisfying a predetermined condition in the game, a chance of acquiring a predetermined in-game content from each selection target group can be given with a predetermined number of times as an upper limit. For example, by satisfying the predetermined condition, a chance of performing a selection process up to six times to acquire a content is given. In the exemplary embodiment, at the first acquisition chance out of the maximum of six times, a selection process is performed without requesting any additional compensation, and a content selected by the selection (that is, a selected content) is given to the user. On the other hand, at the second and subsequent acquisition chances, a predetermined compensation is requested to perform the selection process and/or give a content. For convenience of description, in order to distinguish from the first selection, the selection for selecting the above in-game content is referred to as a "second selection".

Here, a supplemental description of the second selection will be given. First, in the following description, in a certain selection target group, an in-game content that is yet to be given to the user yet is referred to as a "selection target content". In the exemplary embodiment, the total number and a breakdown of selection target contents that are selection targets in a certain selection target group are determined in advance, and a content given to the user is excluded from the selection targets for the next and subsequent times (in the case where there are a plurality of items that are the same, the remaining number thereof is decreased). That is, an upper limit is provided to the number of in-game contents that can be acquired by the user from one selection target group. In other words, in the second selection in the exemplary embodiment, an upper limit is provided to the number of selection times the user can execute the second selection process for one selection target group (it can also be said that the number of times of selection is limited). If all the selection target contents are excluded from the selection targets, it can be considered that the user has acquired all the selection target contents in the selection target group. For example, it is assumed that in a selection target group A, 100 items are set in total, and 10 items A, 30 items B, and 60 items C are set as a breakdown. In this case, an item (item selected) given to the user through the second selection process of each time is regarded, for example, as being "already acquired" or "already selected", and is excluded from the selection targets for the next and subsequent times (the remaining number of the corresponding items is decreased). By performing the second selection process up to 100 times, the user can acquire all the 100 items. In the following description, such a selection target group from which all selection target items can be acquired by performing a selection process until there is no selection target left is referred to as a "limited-type selection target group".

Here, as described above, in the exemplary embodiment, limited-type selection target groups presented to the user are only some of prepared limited-type selection target groups (for example, five out of ten), and the presented content thereof can be updated (changed) on the basis of a user's operation. More specifically, when an operation for the update is performed, the first selection is performed. That is, a process of determining limited-type selection target groups to be presented by a selection is performed. Therefore, as a result of the update operation, a limited-type selection target group that was presented before the update may no longer be presented. In addition, as a result of a further update operation, the limited-type selection target group that was not presented may be presented again (selected as a result of the first selection again). In this regard, in the exemplary embodiment, an acquisition status of each selection target content in each limited-type selection target group is retained regardless of the presence/absence of the above update operation. When the previously presented limited-type selection target group is presented to the user again, selection target contents are determined using the retained acquisition status. Therefore, even when the above update is performed, the second selection can be continued with adoption of the acquisition status of each selection target item in the limited-type selection target group. For example, it is assumed that, for a certain limited-type selection target group with a total of 100 contents, the update operation is performed for the first time in a state where 30 contents have been already acquired, and, as a result, the limited-type selection target group is not presented to the user. In this case, when the update operation is performed for the second time, and, as a result, the limited-type selection target group is presented to the user again, it is possible to restart the second selection for the limited-type selection target group from the state where 30 contents have been already acquired.

Next, a more specific example of the game in the exemplary embodiment will be described. In the exemplary embodiment, the game using the above-described limited-type selection target groups is realized as a "cargo ship game" with a "cargo ship" and "export" as motifs. In addition, this cargo ship game is one of mini games in the game assumed in the exemplary embodiment.

First, the entirety of the game assumed in the exemplary embodiment will be specifically described. The game according to the exemplary embodiment is a game in which a user virtually lives as a player character in a virtual game world in which various virtual characters (resident characters) live. For example, the user can collect various items and build their own house, or can maintain their garden. In addition, the user can acquire various items by hunting, fishing, or the like, in the game, or by having a conversation with a resident character or the like.

The cargo ship game is a mini game that is started when the player character starts conversation with a predetermined character in the virtual game world. The outline of the cargo ship game will be described. First, as sailing destinations, a plurality of islands are presented to the user. The user selects a sailing destination, loads predetermined cargos into a ship, and causes the ship to depart. Thereafter, when the ship returns to port as a result of an elapse of a predetermined time period or the like, a plurality of "souvenirs" corresponding to the sailing destination island are presented to the user. Then, in the game, the user acquires a predetermined in-game content by making a selection from among the souvenirs. Here, in the exemplary embodiment, each of the "islands" shown as the sailing destinations corresponds to the above limited-type selection target group. In addition, in-game contents that can be acquired as souvenirs at each island correspond to the above selection target contents.

In the exemplary embodiment, the selection target contents of each island are not exactly the same as those of the other islands. That is, at least a part of the selection target contents of a certain island does not overlap selection target contents of the other islands.

In the exemplary embodiment, a "completion item" is also set for each island. The "completion item" is an in-game content that is additionally given as a special reward to the user when all the selection target contents at the island are given to the user (the second selection is performed the upper limit number of times).

Next, a rough flow of game progressing of the above cargo ship game will be described. In the cargo ship game, four phases including (1) sailing destination selection→(2) departure preparation and departure decision→(3) waiting for return→(4) souvenir acquisition are set as one cycle, and the game is caused to proceed by repeating this cycle.

Next, the outline of operations and processes that can be performed in each of the above phases will be described using screen examples.

[Sailing Destination Selection]

Figure 2:
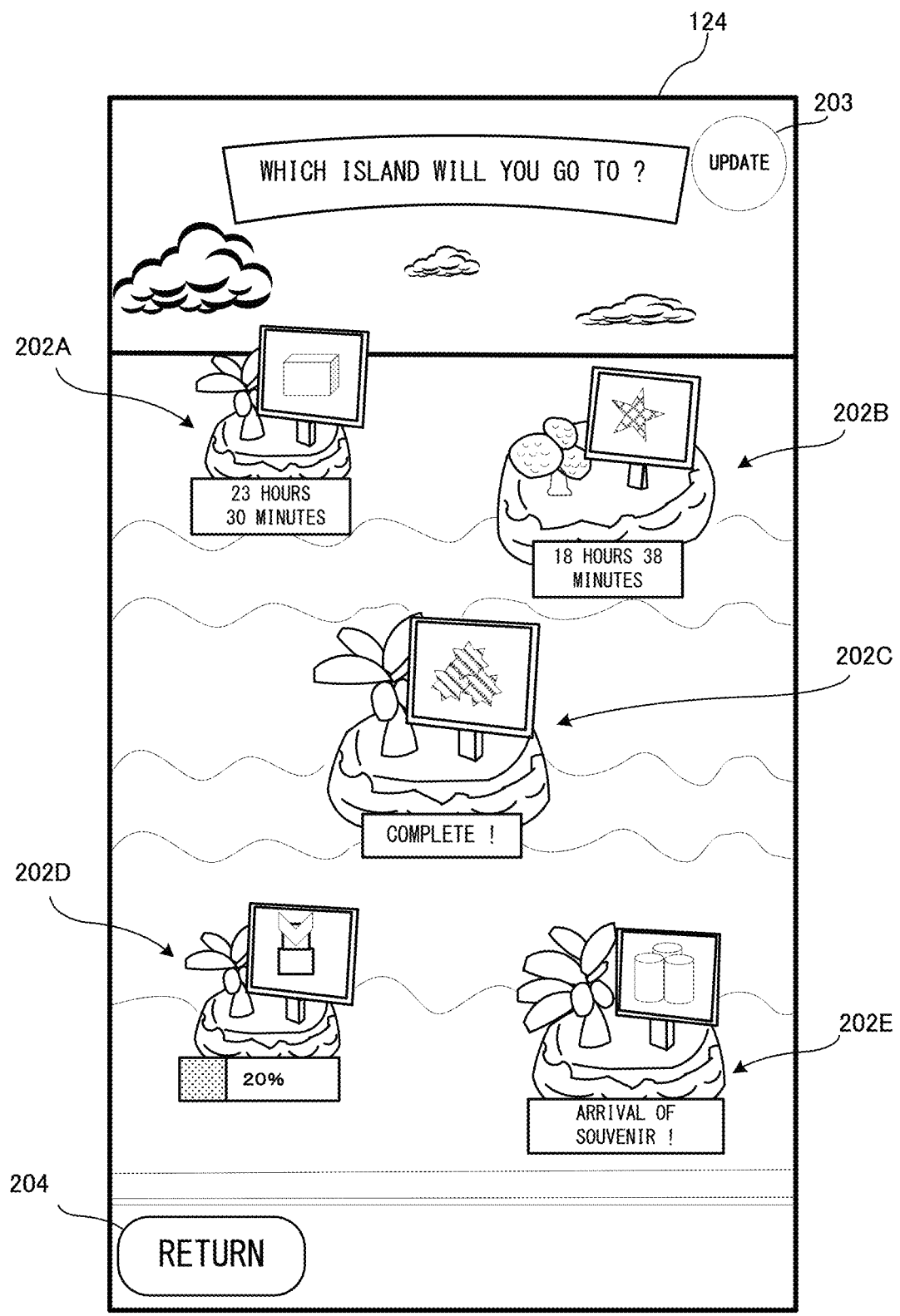
FIG. 2 illustrates a non-limiting example of a game screen.
Figure 3:
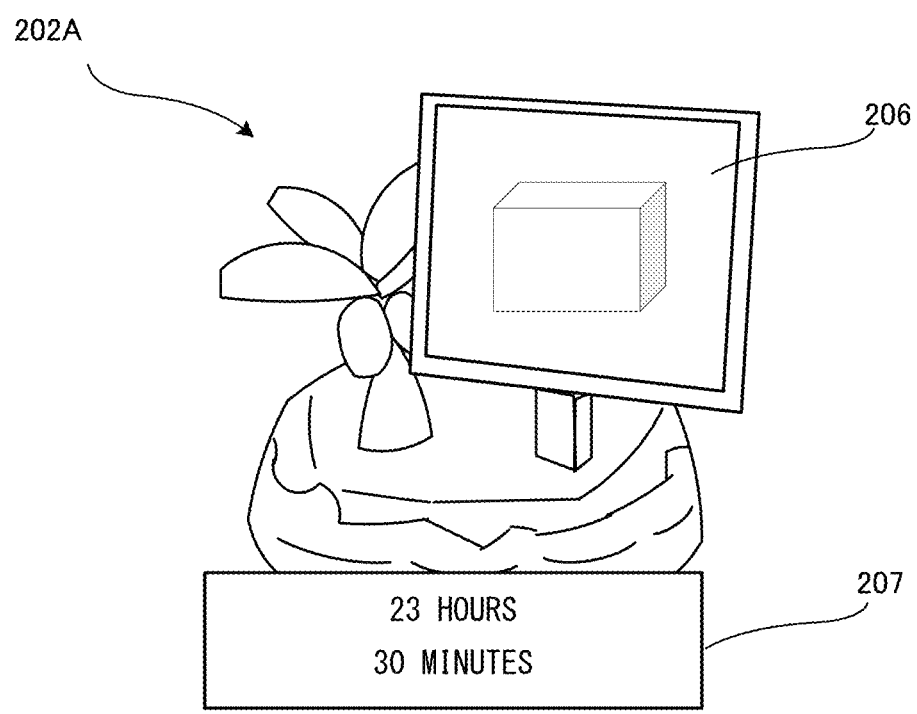
FIG. 3 illustrates a non-limiting example of a game screen.

When the cargo ship game is started, a screen shown in FIG. 2 is initially displayed. FIG. 2 illustrates an example of a sailing destination selection screen. In FIG. 2, five island objects 202A to 202E (hereinafter, sometimes collectively referred to as island objects 202) are displayed on a background imitating an ocean. FIG. 3 shows an enlarged view of the island object 202A. Each island object 202 includes an image having an island appearance/shape, a placard image 206, and a status display area 207. In the placard image 206, an image showing any one of selection target items that can be acquired at the island is displayed. In the exemplary embodiment, for example, a selection target item corresponding to a "special-feature product" is displayed therein. The following information is displayed as appropriate in the status display area 207. First, in the middle of sailing for the island, the remaining time of a waiting time described later is displayed. In addition, when a return to port has been made but a souvenir has not been received, information indicating this is displayed (for example, characters of "arrival of souvenir !"). In addition, when neither a departure nor a return to port has been made, the acquisition status of each selection target item of the island is displayed as a percentage. In addition, when all the selection target items are acquired, information indicating this (for example, a character of "complete") is displayed. Moreover, a display of "New !" indicating that an island is presented to the user for the first time, etc., are also displayed.

Referring back to FIG. 2, when the user performs a tap operation on the island object 202 for which a departure has not been made, in this screen, a transition can be made to a screen of departure preparation described later. In the exemplary embodiment, it is possible to cause a plurality of ships to depart at the same time, but one ship can be caused to depart for one island at one time.

Figure 4:
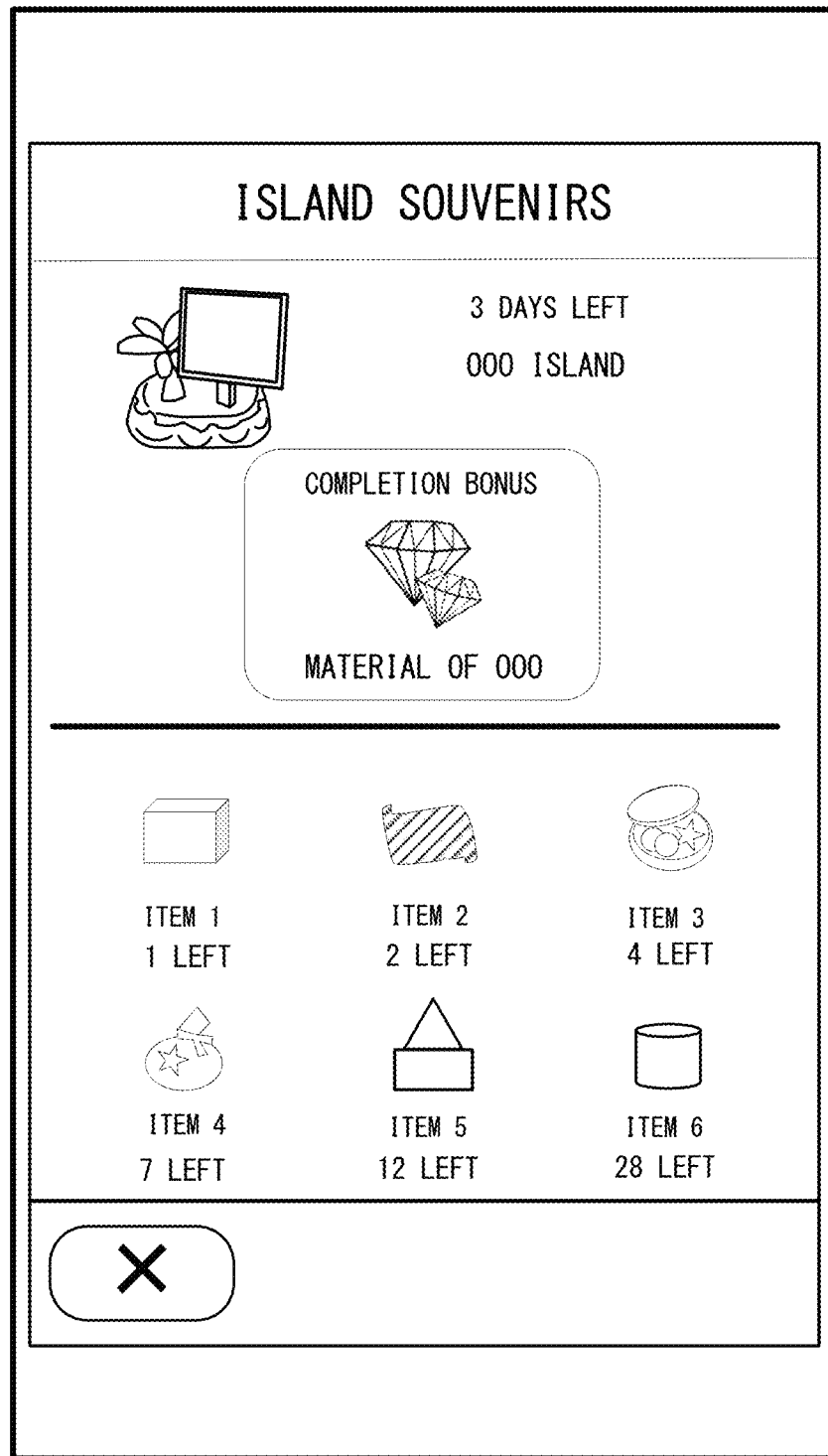
FIG. 4 illustrates a non-limiting example of a game screen.

When, for example, a long pressing operation or the like is performed on the island object 202, a detailed information screen for the island is also displayed as shown in FIG. 4. In the exemplary embodiment, in-game contents that can be acquired are different for each island, and the user can confirm the items and the like that may be acquired, by displaying the screen. In this screen, a completion item that can be acquired at the island, and information indicating the remaining number of selection target items, etc., are displayed.

Referring back to FIG. 2, a return button 204 is displayed in a lower portion of the sailing destination selection screen. By performing, for example, a tap operation on the return button 204, the user can end the cargo ship game. In addition, an update button 203 is displayed in an upper right portion of the sailing destination selection screen. By performing a tap operation on this button, the user can update the islands displayed in the sailing destination selection screen.

Here, the outline of a process of updating the above sailing destination selection screen will be described. In the exemplary embodiment, it is possible to update the sailing destination selection screen, that is, to change the contents presented as sailing destinations, on condition that the following two conditions are satisfied. First, as a condition regarding a sailing state, a condition that there is no ship in the middle of sailing and there is no island for which a souvenir has not been acquired after a return to port is set. If an operation is performed on the update button 203 when this condition is not satisfied, a message indicating that update cannot be performed is displayed, and update of the sailing destination selection screen is not performed.

Figure 5:
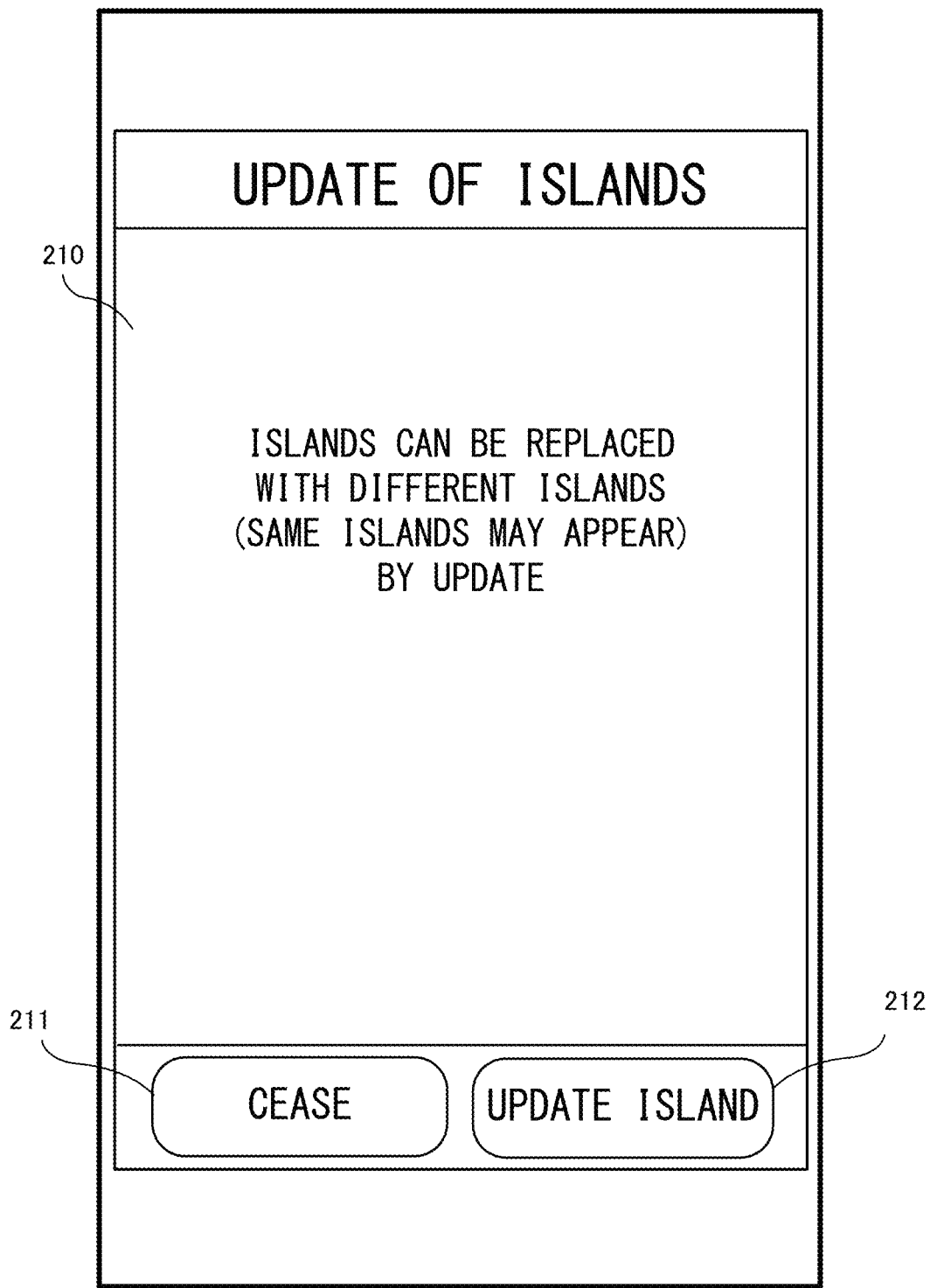
FIG. 5 illustrates a non-limiting example of a game screen.

Even when the above first condition is satisfied, an elapse of a predetermined time period from a previous update operation is further required as a temporal condition that is the second condition. For example, when an update operation is performed once, an update operation cannot be performed until 24 hours has elapsed (an update operation is possible only once a day). In other words, a right to update the sailing destination selection screen is given to the user as a result of an elapse of the predetermined time period. FIG. 5 illustrates an example of an update confirmation screen displayed when a tap operation is performed on the update button 203 in a state where the above two conditions are satisfied. In FIG. 5, a first sailing destination update confirmation dialog 210 including a message indicating that update is to be performed, a "cease" button 211, and an "update island" button 212, is displayed. When the user taps the "update island" button 212 in the screen, the above first selection is performed. That is, a selection process of determining which limited-type selection target groups to present to the user is executed. Then, islands newly selected by the first selection are displayed in the sailing destination selection screen.

Here, in the exemplary embodiment, a rarity is set for each selection target item. For each of islands having a selection target item with a high rarity, a lower appearance rate is set than those for the other islands. That is, as a result, a rarity is set for each island. In addition, when an island with a high rarity is selected as a result of the first selection, the sailing destination selection screen may be displayed with its display form changed such that the user easily recognizes this island as an inland with a high rarity. For example, the entirety of this island is displayed in gold, or a representation that makes this island itself shine is performed.

In the exemplary embodiment, regarding the temporal condition, it can also be made possible to immediately update the sailing destinations in exchange for consumption of game currency. Here, a supplemental description of the game currency in the exemplary embodiment will be described. In the exemplary embodiment, first virtual currency that is referred to as "bell" in the game and second virtual currency that is different from the bell and referred to as "ticket" in the game are used. The difference between the two kinds of virtual currencies will be described. First, regarding the "bell", a method for acquiring the "bell" is limited in the game world. For example, the "bell" can be acquired by selling a predetermined game item (furniture article, etc.). In addition, the "bell" can also be acquired by selling an item acquired by the above fishing or hunting. Moreover, it is also possible to acquire the "bell" as a "quest" reward. Meanwhile, the "ticket" is a virtual currency that can also be acquired by payment processing using currency in the real world. That is, the "ticket" is a virtual currency given to the user in accordance with the amount of payment. For example, other than the above acquisition method, the "ticket" can be obtained as a quest reward or in the form of being distributed, but cannot be acquired by selling a game item such as the above furniture article, unlike the "bell".

Figure 6:
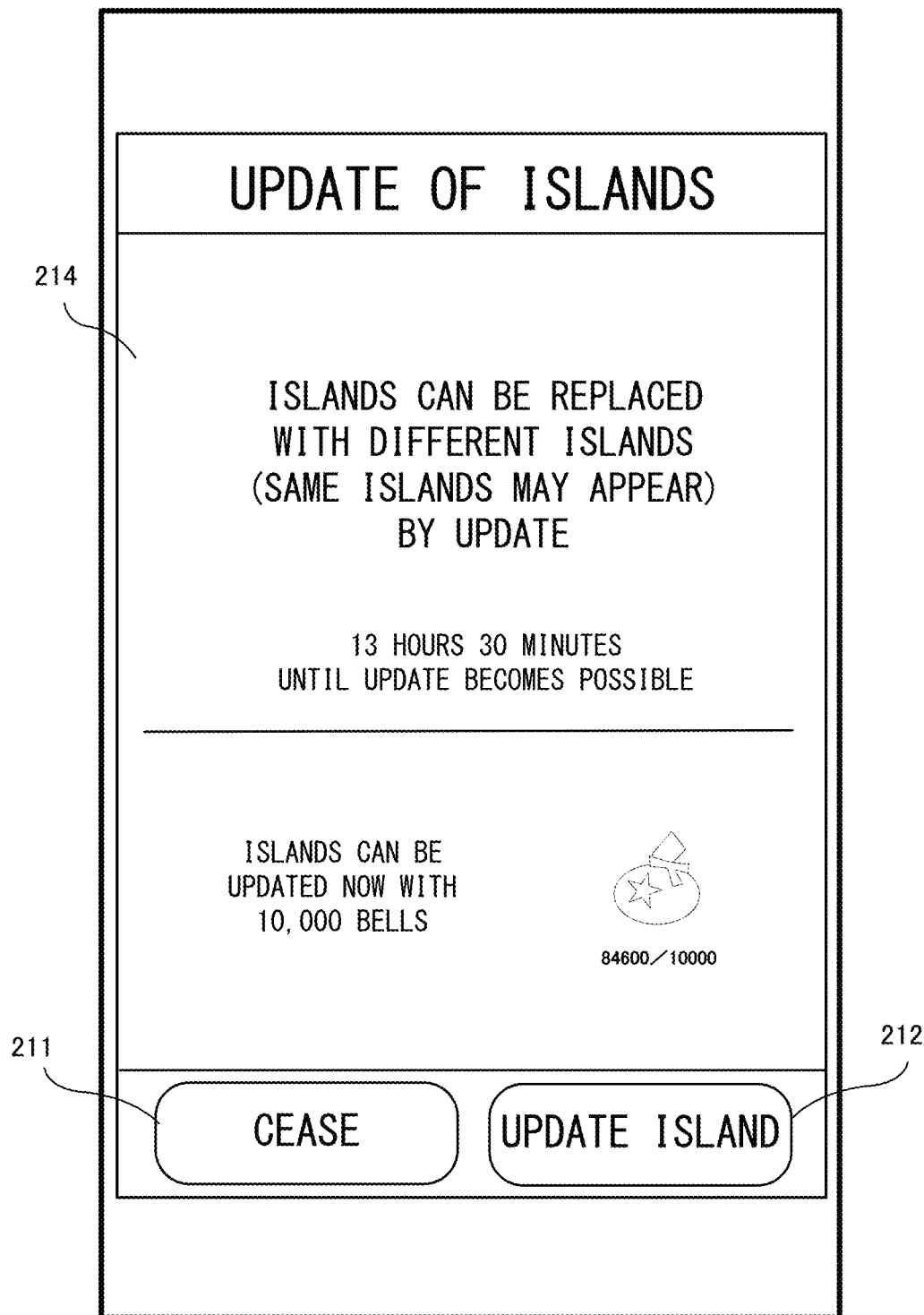
FIG. 6 illustrates a non-limiting example of a game screen.

In the exemplary embodiment, it is possible to immediately update the sailing destinations by consuming the "bell" (however, in this case as well, the condition regarding the sailing state needs to be satisfied). FIG. 6 illustrates an example of an update confirmation screen displayed when a tap operation is performed on the update button 203 in a state where the temporal condition is not satisfied. In FIG. 6, a second sailing destination update confirmation dialog 214 is displayed. In the second sailing destination update confirmation dialog 214, a remaining time until update becomes possible without consumption of the "bell" is also displayed in addition to the above contents in FIG. 5. Furthermore, a message indicating that immediate update is possible by consumption of the "bell", and a display indicating the number of "bells" required for the immediate update are included. When the user performs a tap operation on the "update island" button 212 in this screen, the number of bells required are consumed (on condition that the number of bells possessed is sufficient), and update of the sailing destination selection screen by the above first selection is performed. That is, even when the basic condition of an elapse of the predetermined time period is not satisfied, if an additional condition of "bell" consumption is satisfied, the satisfaction of the additional condition is regarded as satisfaction of the temporal condition.

In the exemplary embodiment, unless the user operates the update button 203, the sailing destination selection screen is not updated. This prevents an island that is a sailing destination from not being presented as a result of the update before a return to port even when a predetermined game item is consumed as a cargo and the ship is caused to depart. In addition, accordingly, for example, when an island with a high rarity is displayed as a result of the update operation being performed several times, it is also possible for the user not to perform the update operation until the user acquires an in-game content with a high rarity from this island. Moreover, simply, it is possible to prevent all currently presented islands from being updated until acquisition of items that can be acquired is completed. As described above, it is possible to provide the user with various ways of playing.

In the exemplary embodiment, the display form of the update button 203 is changed by satisfying a predetermined condition. For example, the update button 203 is highlighted by causing the update button 203 to blink. In the exemplary embodiment, since the lineup of sailing destinations does not change unless the user actively operates the update button 203, the change of the display form is intended to urge the user to update the sailing destination selection screen. Examples of the predetermined condition include the following. First, when a condition that acquisition of items has been completed for all the currently presented sailing destinations is satisfied, the update button 203 is highlighted and displayed. Moreover, when the sailing destination selection screen is displayed after a certain period elapses from the time when previous update is performed, the update button 203 is highlighted. In addition to the above, the update button 203 may be highlighted at a timing when it may be desired to urge the user to actively perform update.

An island for which all the selection target contents have been acquired may be excluded from the targets of the first selection to be subsequently performed. Alternatively, the content (acquisition status) of each selection target content of this island may be initialized, and then this island may be set as a target of the first selection again. The former is useful in the case where it is desired to cause an in-game content, for which there is only one chance to acquire (a plurality of which do not want to be acquired by the user), to appear, and the latter is useful in the case where it is desired to cause an in-game content, a plurality of which may be acquired, to appear.

[Departure Preparation and Departure Decision]

Figure 7:
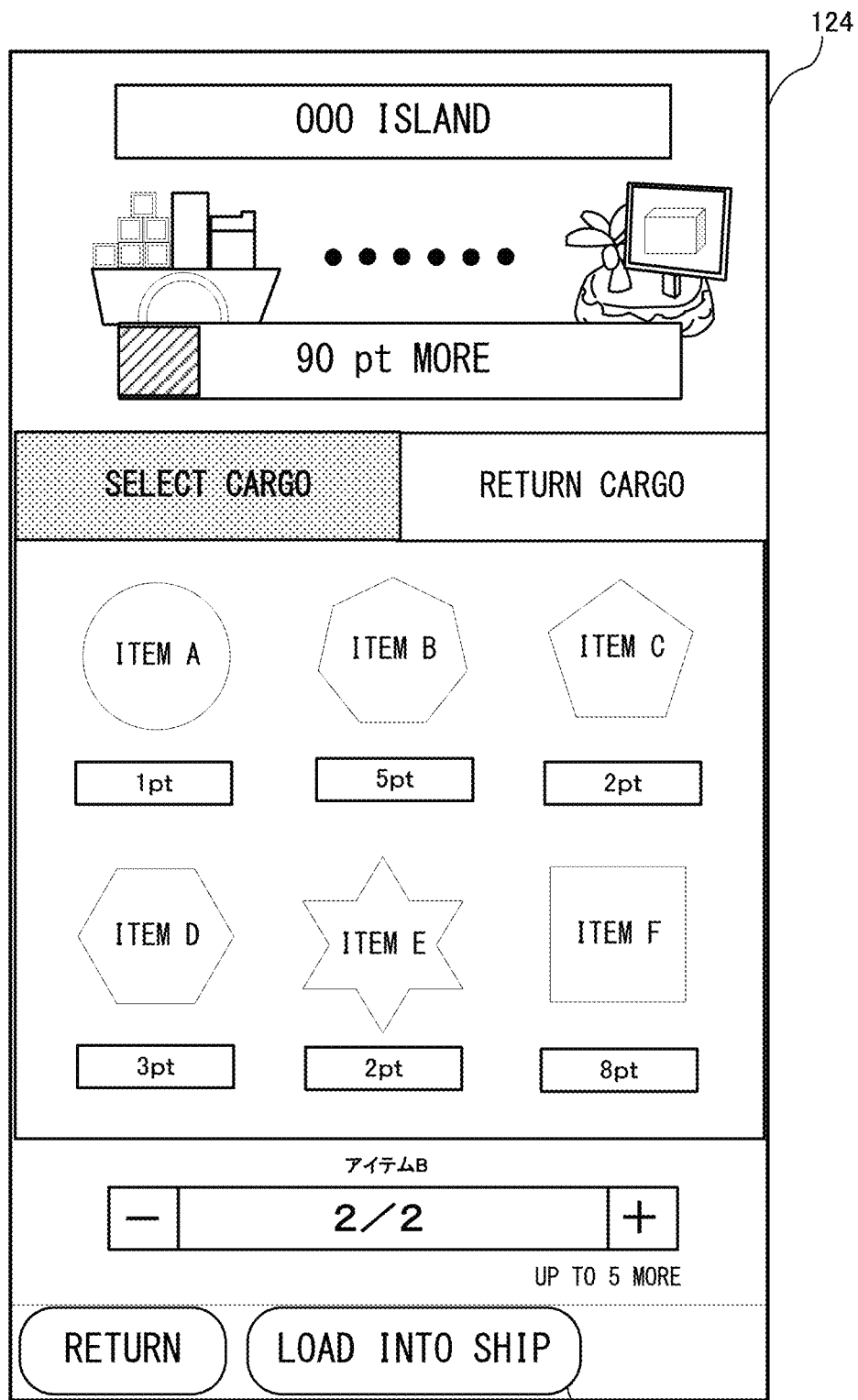
FIG. 7 illustrates a non-limiting example of a game screen.

Next, the outline of a process regarding departure preparation and departure decision will be described. When the user selects an island for which a departure has not been made in the sailing destination selection screen, a screen is displayed as shown in FIG. 7. FIG. 7 illustrates an example of a departure preparation screen. In this screen, the user performs an operation for deciding a cargo to be exported to the selected island and load the cargo into the ship. Specifically, in the exemplary embodiment, an export point is set for each in-game item that is possessed by the user and can be exported as a cargo. The export point is a value indicating weighting of each item. For example, the export point for "apple" which is an example of the in-game item is 1 point, and the export point for "chair" is 5 points (in the example of FIG. 7, for example, item A corresponds to "apple", and item B corresponds to "chair"). In addition, for each item, the maximum number of items that can be loaded is also set. For example, for "apple", the maximum number is three. Furthermore, in the exemplary embodiment, for each island, export points required for a departure (hereinafter, required points) are set. The user performs an operation for combining possessed items such that the total of the export points of the respective items satisfies the required points, and loading the items as cargos into the ship. In other words, it can be also said that one condition for a departure, that is, one condition for performing a limited-type selection and acquiring a souvenir, is a condition that the user possesses the required number of predetermined required items that are set for each island (when these items are exported, these items are subtracted from the possessed items).

In the example of FIG. 7, information indicating the remaining required points required for a departure is displayed in an upper portion of the screen. A list of images of the items possessed by the user (to be cargo candidates) and an export point value set for each item are indicated in a center portion of the screen. In addition, a "+" button and a "−" button for increasing and decreasing the number of selected items to be loaded into the ship are displayed in a lower portion of the screen. Furthermore, information regarding the number of selected items is indicated at a position between the "+" button and the "−" button. Specifically, the information regarding the number of items to be loaded into the ship is indicated in the form of "number to be loaded/number possessed". The user selects a predetermined item image from the list and selects a number to be loaded by operating the "+" and "−" buttons in the lower portion of the screen. Then, the user can load the selected items as cargo into the ship by pressing a "load into ship" button 215. Then, the export point of each item is added, and it is also determined whether the required points are satisfied. When the required points are satisfied, display of the "load into ship" button 215 changes to a "depart" button (not shown). By the user performing a tap operation on the "depart" button, a departure is decided and started.

[Waiting for Return]

Next, return waiting for return will be described. After a departure is started as described above, when a "waiting time" that is defined in advance for each island has elapsed, a state where the ship that has departed has returned to port is obtained. That is, until the waiting time elapses, the user basically waits for a return to port. In other words, it can be also said that an elapse of the waiting time is one condition for performing a limited-type selection and acquiring a souvenir.

Figure 8:
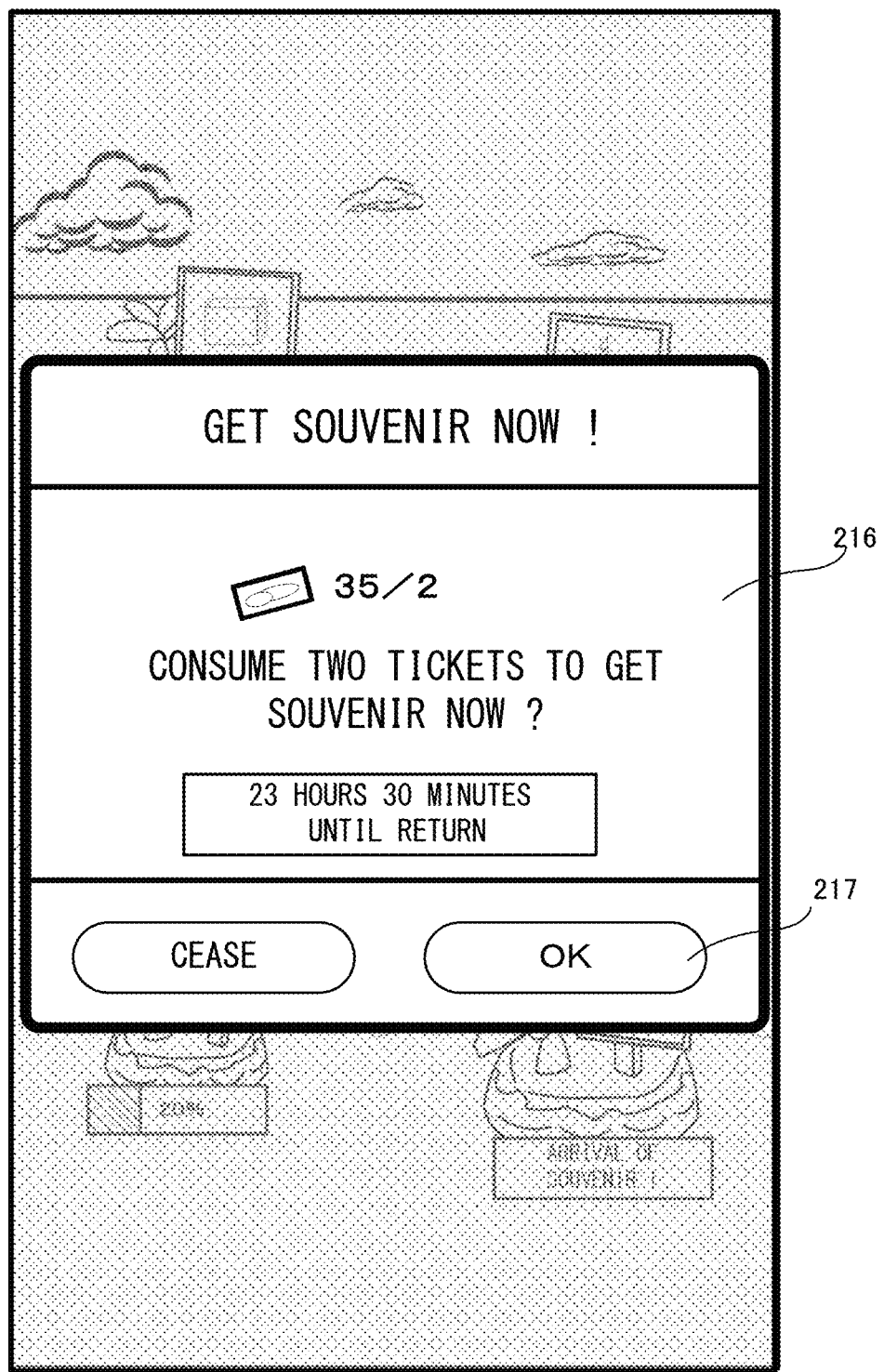
FIG. 8 illustrates a non-limiting example of a game screen.

Here, regarding the waiting time, in the exemplary embodiment, it is also possible to make an immediate return to port by consuming the above "ticket". For example, when the user performs a tap operation on the island object 202 for which sailing is being carried out and the remaining time until a return to port is displayed in the sailing destination selection screen, a time shortening confirmation dialog 216 is displayed as shown in FIG. 8. In FIG. 8, a message indicating that it is possible to cause the ship in the middle of sailing to immediately return to port by consuming two "tickets" is shown. When the user performs a tap operation on an OK button 217 in this screen, the ship in the middle of sailing can be caused to immediately return to port in exchange for consumption of two "tickets".

[Souvenir Acquisition]

Figure 9:
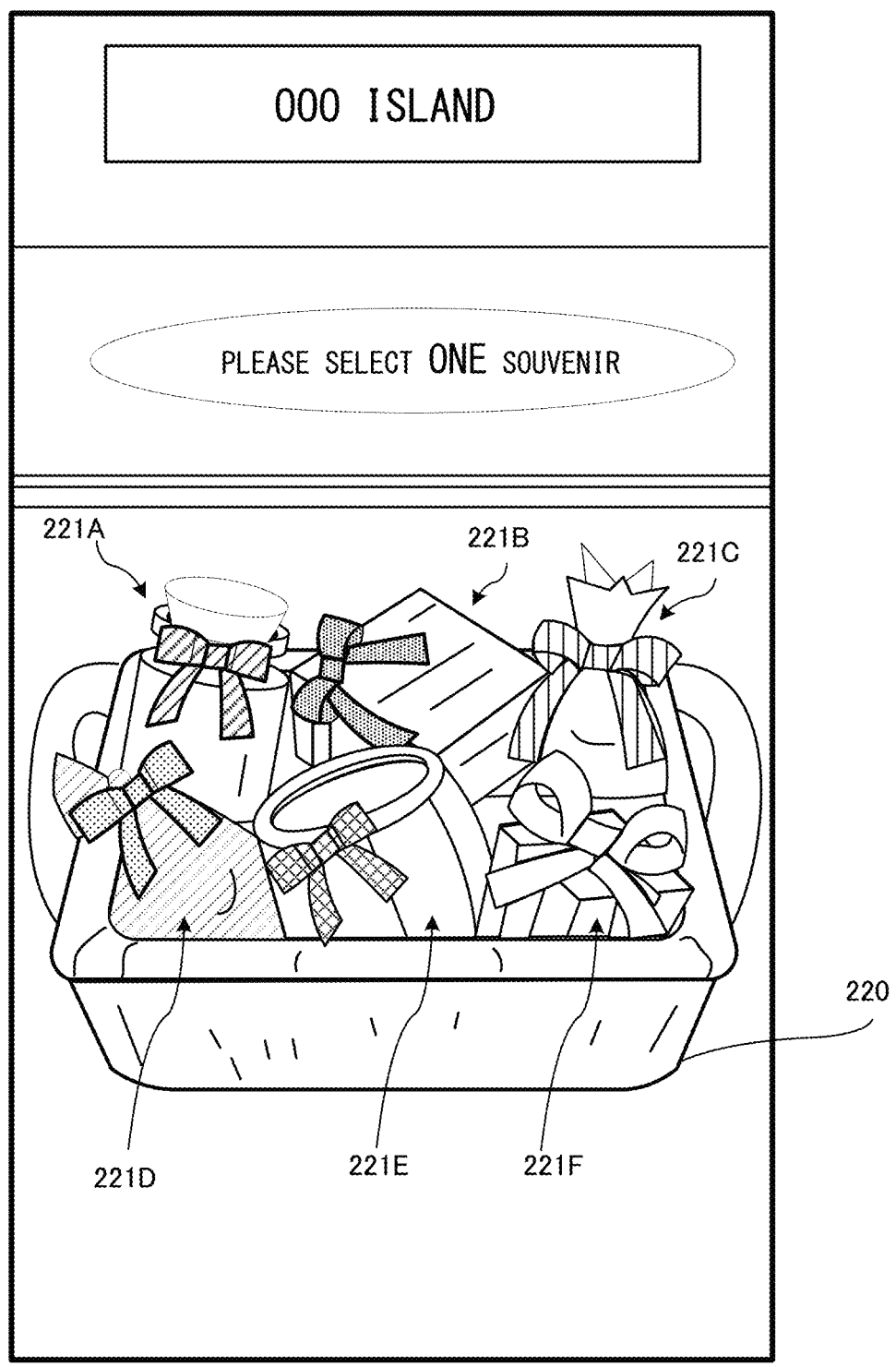
FIG. 9 illustrates a non-limiting example of a game screen.

Next, the outline of a process of souvenir acquisition will be described. When the ship that has departed returns to port, "acquisition of souvenir !" is displayed in the status display area 207 of the island object 202 for and from which a departure and a return to port have been made, in the sailing destination selection screen. When the user performs a tap operation on the island object 202 from which a return to port has been made, a souvenir acquisition screen is displayed as shown in FIG. 9. In FIG. 9, a state where souvenir objects 221A to 221F are contained in a basket object 220 is shown. That is, six souvenir objects 221 are presented to the user. Each of the souvenir objects 221 corresponds to any of the in-game contents that can be selected from among a limited-type selection target group. That is, at this time point, a chance of acquiring up to six in-game contents is given to the user. In addition, in FIG. 9, a message that urges the user to select any one souvenir object 221 is also displayed.

In the exemplary embodiment, the case where the number of souvenir objects 221 is six is taken as an example, but the number of souvenir objects 221 is not limited thereto. For example, in another exemplary embodiment, the number of souvenir objects 221 may be four, five, or the like. In addition, in another exemplary embodiment, the number of souvenir objects 221 to be presented to the user in the souvenir acquisition screen may be randomly determined. In this case, since the first souvenir can be acquired by the user without any compensation, the number of second and subsequent souvenirs may be randomly determined. For example, souvenir objects 221, the number of which is randomly determined between two to six, may be displayed. The term "randomly" does not necessarily mean equal probability. For example, the case of calculating the number by using a predetermined formula is also included. In addition, the number of souvenir objects 221 may be randomly determined at the time of a departure or at the time of a return to port.

When the number of selection target contents remaining in the limited-type selection target group of the island for and from which a departure and a return to port have been made this time is five or less, the number of souvenir objects 221 displayed in this screen is also five or less. For example, when the number of remaining selection target contents is only three, the number of souvenir objects 221 presented to the user is also up to three.

In the exemplary embodiment, the souvenir acquisition screen is displayed each time the ship that has departed for a certain island returns to port. That is, each time the ship returns to port, the user acquires a chance (selection chance)

of acquiring an in-game content, with the number of souvenir objects 221 as the upper limit number of times. As described above, in the exemplary embodiment, the number of souvenir objects 221, that is, the number of times an in-game content can be acquired in one cycle of a departure to a return to port, is limited. Therefore, for example, in the case of an island for which 100 items are set, and when six souvenir objects 221 are displayed at one return to port, at least 17 cycles of a departure to a return to port need to be carried out in order to acquire all the selection target contents of this island.

Next, the display form of each souvenir object 221 in the screen example shown in FIG. 9 will be described. In the exemplary embodiment, each souvenir object 221 is displayed in a form in which the content thereof (an in-game content that can be acquired) cannot be specified from the appearance of the souvenir object 221. In the exemplary embodiment, each souvenir object 221 is displayed by using images of several types of packages (bags, boxes, etc.), and each souvenir object 221 is presented to the user in a form in which what is inside is not recognized. That is, a plurality of types of package images are used as the appearance of the souvenir objects 221, but the images have no relation with the obtained in-game contents.

When the user performs a tap operation (hereinafter, a souvenir opening operation) on any souvenir object 221 in the screen shown in FIG. 9, a predetermined in-game content selected by the above second selection process is given to the user. A predetermined representation such as an opening representation may be displayed at this time.

Figure 10:
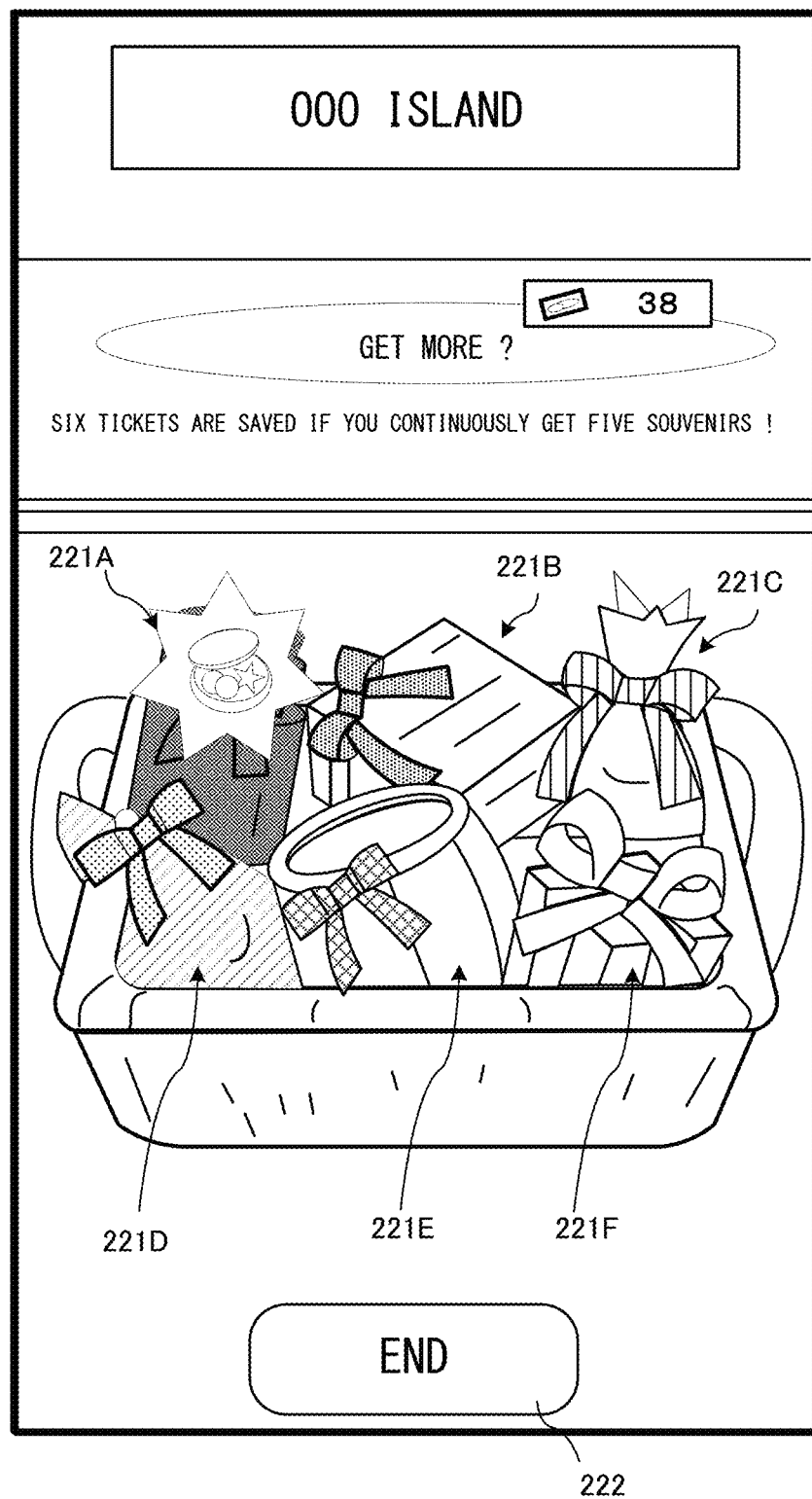
FIG. 10 illustrates a non-limiting example of a game screen.

Here, an example of a screen displayed when a tap operation is performed on the souvenir object 221A will be described. In this case, a screen is displayed as shown in FIG. 10. In FIG. 10, the souvenir object 221A that has been already opened is grayed out in order to indicate that the souvenir object 221A has been already opened. In addition, an image indicating the in-game content given to the user is also displayed so as to be superimposed on the souvenir object 221A. Moreover, a message to inquire whether there is a desire to acquire second and subsequent souvenirs, and an image indicating the number of "tickets" possessed, are also displayed above the souvenir objects 221. In the exemplary embodiment, in the case where it is desired to acquire the second and subsequent souvenir objects 221, consumption of "tickets" is requested as a compensation. Therefore, it is clearly presented to the user that tickets are required to obtain the second and subsequent souvenir objects 221. In addition, in this screen, an "end" button 222 that is not displayed in the previous screen is also displayed. When a tap operation is performed on the "end" button 222, even if the second and subsequent souvenir objects 221 that are yet to be opened remain, the screen is ended. That is, the first souvenir can always be acquired, but whether to acquire the second and subsequent souvenirs is based on the user's intention (whether to use "tickets").

Here, in FIG. 10, a message indicating that the number of "tickets" can be saved when souvenir objects are continuously acquired, is also displayed. This message indicates that the number of tickets consumed in total can be reduced by continuously performing the second selection rather than performing the above second selection a plurality of times without continuation. For example, the case where five tickets are basically requested in the case of performing the second selection at a single time, is assumed. In this case, (basic) five tickets are requested in the case of acquiring the second souvenir object 221, but the number of tickets required is reduced by one each time of one continuation, for example, four tickets are required in the case of subsequently acquiring a third souvenir object 221 with continuation, and three tickets are required in the case of subsequently acquiring a fourth souvenir object 221 with continuation. For example, the case of acquiring 12 in-game contents is considered. In this case, the number of "tickets" consumed in total can be reduced by repeating the acquisition of six souvenir objects 221 twice rather than by repeating the acquisition of two souvenir objects 221 six times at one return to port.

Figure 11:
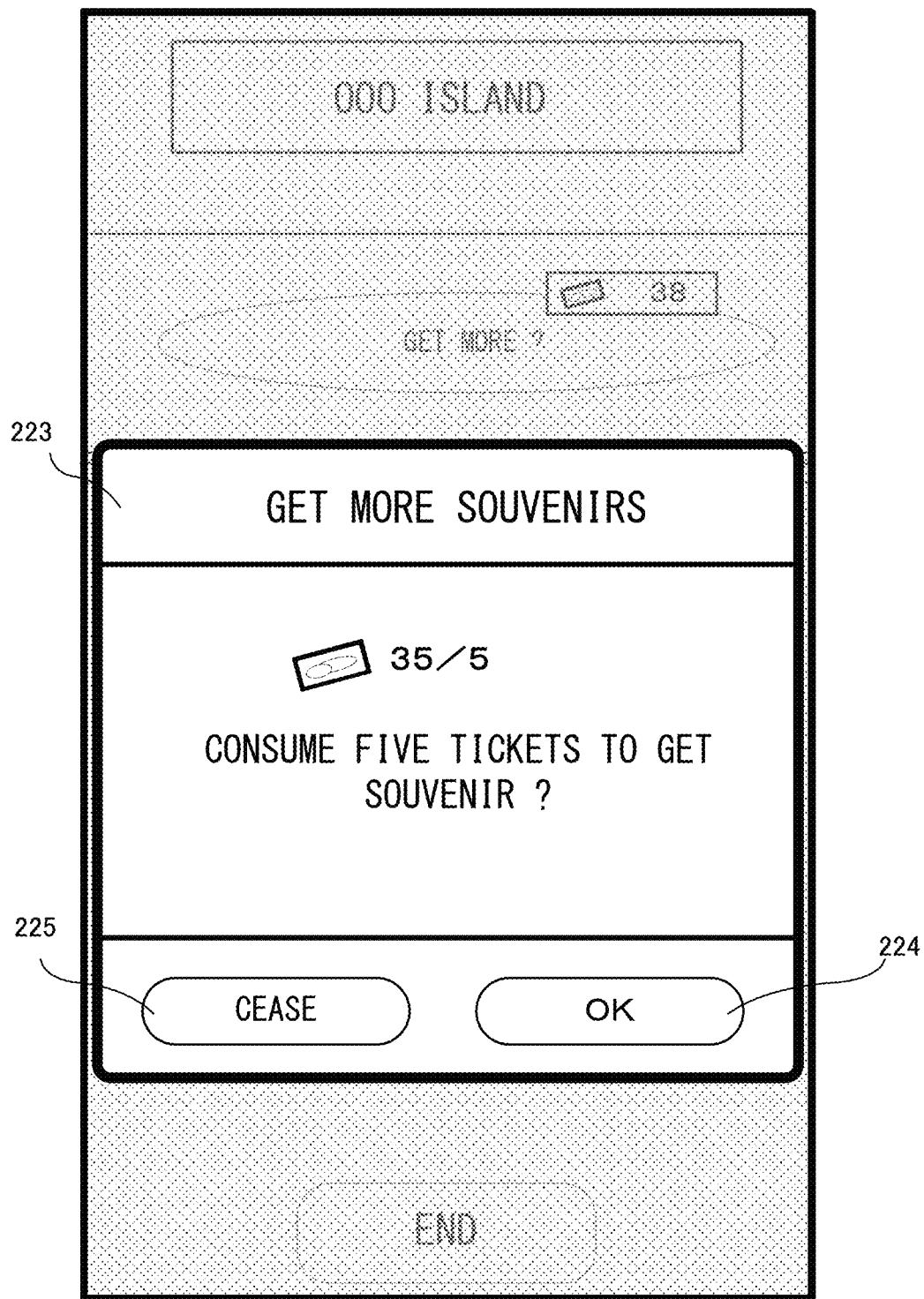
FIG. 11 illustrates a non-limiting example of a game screen.

When the user performs a tap operation on any unopened souvenir object 221 in the screen of FIG. 10, a "ticket" consumption confirmation dialog 223 is displayed as shown in FIG. 11. In FIG. 11, information indicating the "number of tickets" required to acquire the souvenir object 221 at this time is shown to the user. Then, when the user performs a tap operation on an OK button 224, the required number of "tickets" is consumed, and the second selection process is executed. Then, an in-game content selected is given to the user. Meanwhile, when the user performs a tap operation on a "cease" button 225, ticket consumption and the second selection process are not performed.

As described above, in the exemplary embodiment, regarding the first souvenir object, an in-game content is given to the user without any additional compensation. On the other hand, regarding the second and subsequent souvenir objects 221, it can be said that an in-game content is given to the user in exchange for consumption of a "ticket". In the following description, giving an in-game content as the first souvenir object 221 to the user as described above is referred to as "first giving". In addition, giving an in-game content as the second or subsequent souvenir object 221 to the user is referred to as "second giving". In the exemplary embodiment, it can be said that first giving can be executed without requesting any further compensation as long as a departure condition (in other words, a condition for first giving) is satisfied. In addition, by satisfying a departure condition, a chance of second giving is given to the user, with a predetermined number of times, in this example, a number of times that is equal to a number obtained by subtracting one from the number of souvenir objects 221 presented to the user, as an upper limit, but a compensation is required for the second giving. That is, it can be said that a predetermined compensation ("ticket" in this example) is requested as a condition for second giving.

As described above, when all the selection target contents that are set for the island have been acquired as a result of repeatedly opening the souvenir objects 221, a completion item is also further given. Accordingly, it is possible to provide the user with motivation to repeat a departure for each island and a return to port with the aim of acquiring the completion item.

The timing of a selection for an in-game content given by the above souvenir opening operation may be the timing when the souvenir opening operation is performed. Alternatively, a selection may be performed in advance at the timing when a departure is fixed. For example, the second selection may be performed six times at the timing when a departure is fixed, and the selection results may be assigned to the above six souvenirs. Then, when the souvenir opening operation is performed in the souvenir acquisition screen, the in-game content assigned to the opened souvenir may be given. In the exemplary embodiment, the second selection for the first souvenir is performed at the timing when the above departure is made, and, in the souvenir acquisition screen, regardless of which souvenir object 221 is selected, an in-game content selected by the second selection is given to the user. In addition, regarding the second and subsequent souvenir objects 221, at the timing when the souvenir opening operation for each of the souvenir objects 221 is performed, the second selection process and assignment of the selection result are performed.

[Details of Game Processing According to Exemplary Embodiment]

Next, the cargo ship game processing according to the exemplary embodiment will be described in more detail with reference to FIG. 12 to FIG. 23.

[Data to be Used]

Figure 12:
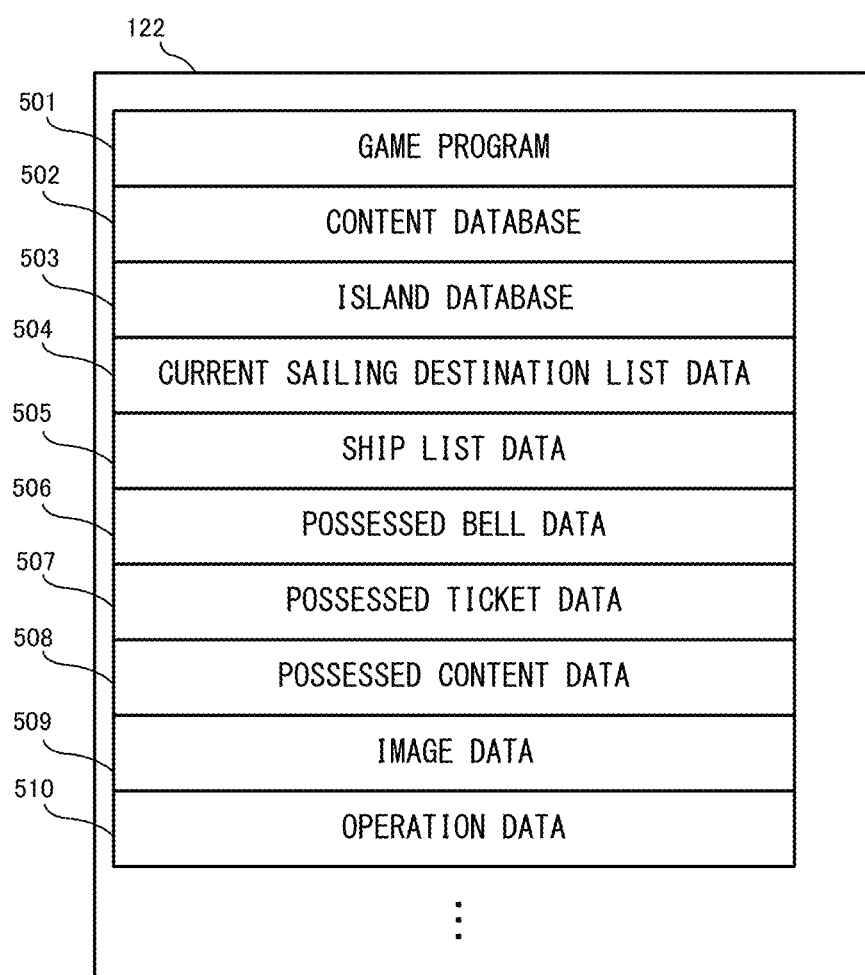
FIG. 12 illustrates a non-limiting example of data stored in a memory 122.

First, various kinds of data to be used in the game processing will be described. FIG. 12 illustrates a memory map showing an example of various kinds of data stored in the memory 122 of the information processing terminal 102. In the memory 122 of the information processing terminal 102, a game program 501, a content database 502, an island database 503, current sailing destination list data 504, ship list data 505, possessed bell data 506, possessed ticket data 507, possessed content data 508, image data 509, operation data 510, etc., are stored.

The game program 501 is a program for executing the game processing according to the exemplary embodiment.

The content database 502 is data that defines each in-game content. FIG. 13 illustrates an example of the data structure of the content database 502. The content database 502 includes a content ID 521, content details data 522, and rarity information 523. The content ID 521 is an identifier for uniquely identifying the content. The content details data 522 is data that defines the specific details of the content. For example, information that defines an appearance image and the like is included. The rarity information 523 is data indicating the rarity of the content.

Referring back to FIG. 12, the island database 503 is data that defines each island. FIG. 14 illustrates an example of the data structure of the island database 503. In FIG. 14, the island database 503 is a database in a table format including items such as an island ID 531, selection target content information 532, a selection table 533, given status information 534, completion item information 535, departure condition information 536, and waiting time information 537.

The island ID 531 is an ID for uniquely identifying each in-game content.

The selection target content information 532 is information that defines each selection target content in the island. For example, a content ID 521 for each content that is a selection target content in each island is defined (detailed information of each content is acquired by referring to the content database 502 on the basis of the content ID 521).

The selection table 533 is information that defines the selection probability of each selection target content. Regarding the second selection process for each island, the second selection process is performed on the basis of the selection table 533. In this example, a selection table is included for each island, but, in another example, a common selection table may be used for each island.

The given status information 534 is data for indicating a status of each selection target content given to the user in each island. It can be also said that the given status information 534 is data indicating which selection target contents and how many selection target contents have been given to the user. In other words, it can be also said that the given status information 534 is selection status information indicating the selected/unselected contents of the selection target contents in each island. In this example, as an example, each selection target content is managed in the form of stock number. For example, in the case where ten items A and twenty items B are included as selection target contents, the selection target contents are managed in the form of "stock number/maximum number" such as "n/10" for the items A and "n/20" (n is an integer) for the items B. Finally, if the stock numbers of all the selection target contents become 0, it means that the selection has been performed the upper limit number of times for the island.

Such information indicating the given status is not limited to the above. The selection target contents of the island may be managed such that data itself of the already selected in-game contents among the selection target contents of the island is deleted, or may be managed using a flag or the like indicating an already selected in-game content, in a form in which data of the already selected in-game content is included but the already selected in-game content is not handled as a selection target content. For example, as the given status information 534, a result of each selection for a selection target content may be retained as a selection history. Then, it may be possible to perform control such that the already selected in-game content is not handled as a selection target content, by referring to the history.

The completion item information 535 is information that defines the completion item of the island.

The departure condition information 536 is data that defines the required points required for a departure for the island, and the details of export items. In the above-described departure preparation screen, by satisfying the required points, etc., that are defined here, it is possible to make a departure for the island.

The waiting time information 537 is information that defines the waiting time from a departure for the island to a return to port.

Referring back to FIG. 12, the current sailing destination list data 504 is data indicating islands presented to the user in the sailing destination selection screen. A predetermined sailing destination is set as the initial value at the time when the cargo ship game is started for the first time. Thereafter, by performing the above update operation, the first selection process is performed, so that the content of the current sailing destination list data 504 is changed.

The ship list data 505 is information indicating the state, etc., of each ship. Here, in the exemplary embodiment, the case where the user possesses five ships is taken as an example. FIG. 15 illustrates an example of the structure of the ship list data 505. The ship list data 505 is data in a table format including a ship ID 541, current state information 542, sailing destination information 543, a departure start time 544, and selection result information 545.

The ship ID 541 is information for identifying each ship. In this example, since the case where the number of ships is five is taken as an example, ship IDs 541 of "01" to "05" are shown in the example of FIG. 15.

The current state information 542 is information indicating the current state of the ship. In this example, information indicating any of "middle of sailing", "already returned to port", and "free" is set. "Middle of sailing" indicates that the ship is sailing for any island. "Already returned to port" indicates a state where the ship has returned to port after a departure and the first souvenir is yet to be opened. "Free" indicates a state that is neither "middle of sailing" nor "already returned to port" (that is, a state where a departure can be made for any island).

The sailing destination information 543 is information indicating the island ID 531 of the sailing destination of each ship in the "middle of sailing".

The departure start time 544 is information indicating the time when each ship in the "middle of sailing" departed. It is possible to calculate the remaining time to a return to port on the basis of this information and the waiting time information 537 of each island.

The selection result information 545 is information that is a stored selection result obtained when the second selection process for the first souvenir is performed at the time of start of a departure in the exemplary embodiment as described above. When the state is "free", nothing is set in the selection result information 545.

Referring back to FIG. 12, the possessed bell data 506 is data indicating the number of the "bells" possessed by the user. The possessed ticket data 507 is data indicating the number of the "tickets" possessed by the user. The possessed content data 508 is data for indicating the in-game contents possessed by the user. The image data 509 is data of various images displayed in the cargo ship game.

The operation data 510 is data acquired from the operation section 123 in predetermined cycles, and is data for indicating the content of an operation performed on the operation section 123 by the user.

In addition, in the memory 122, various kinds of working data to be used in the processing, etc., are also stored as appropriate.

[Details of Processing Executed by Processor 121]

Figure 16:
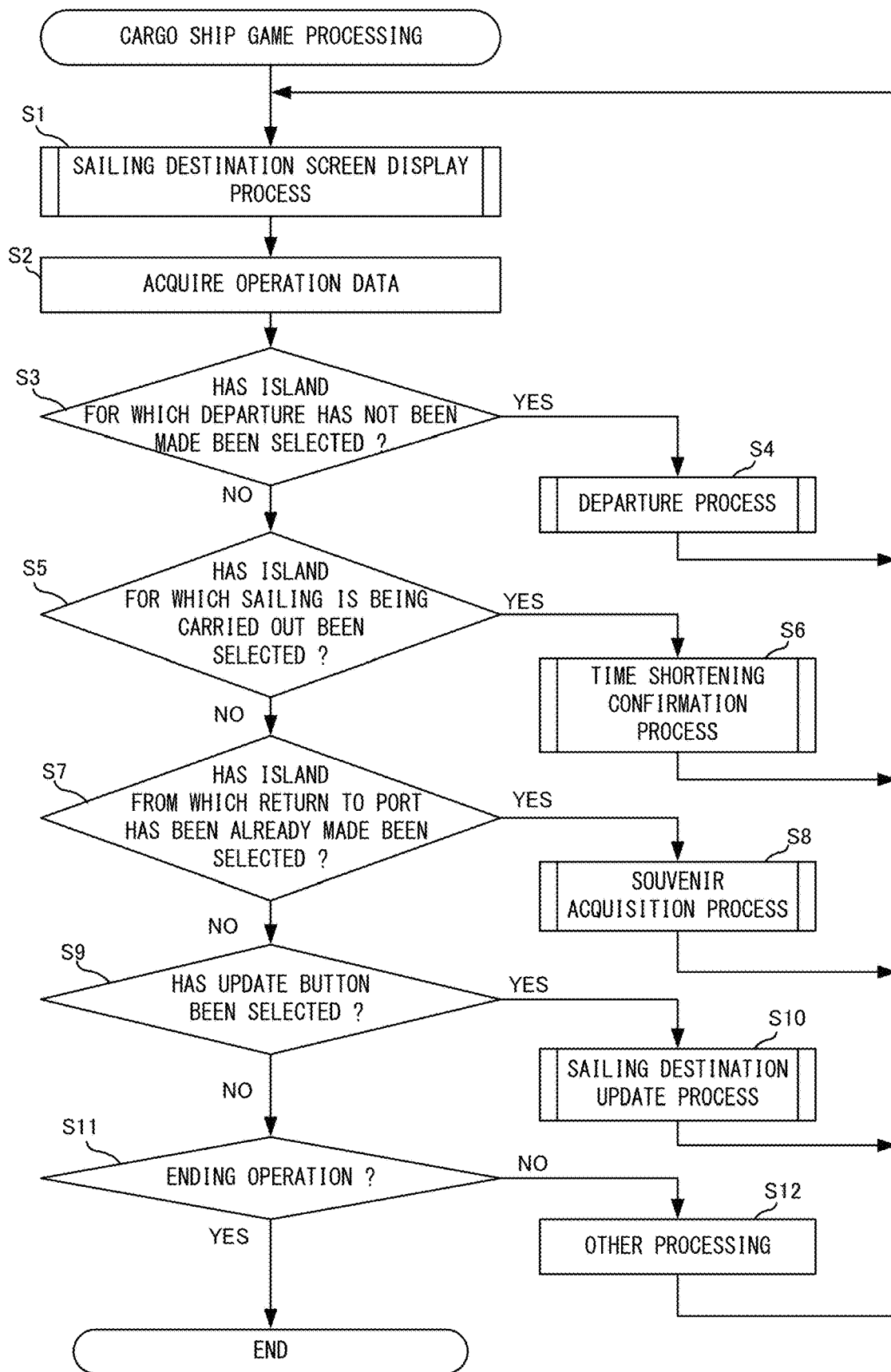
FIG. 16 is a flowchart showing cargo ship game processing in detail.

Next, the cargo ship game processing according to the exemplary embodiment will be described in detail with reference to flowcharts of FIGS. 16 to 23. FIG. 16 is a flowchart showing the cargo ship game processing according to the exemplary embodiment in detail. This processing is started when the player character starts conversation with a predetermined character in the virtual game world as described above. In addition, for convenience of description, a predetermined sailing destination is already set in the current sailing destination list data 504.

Figure 17:
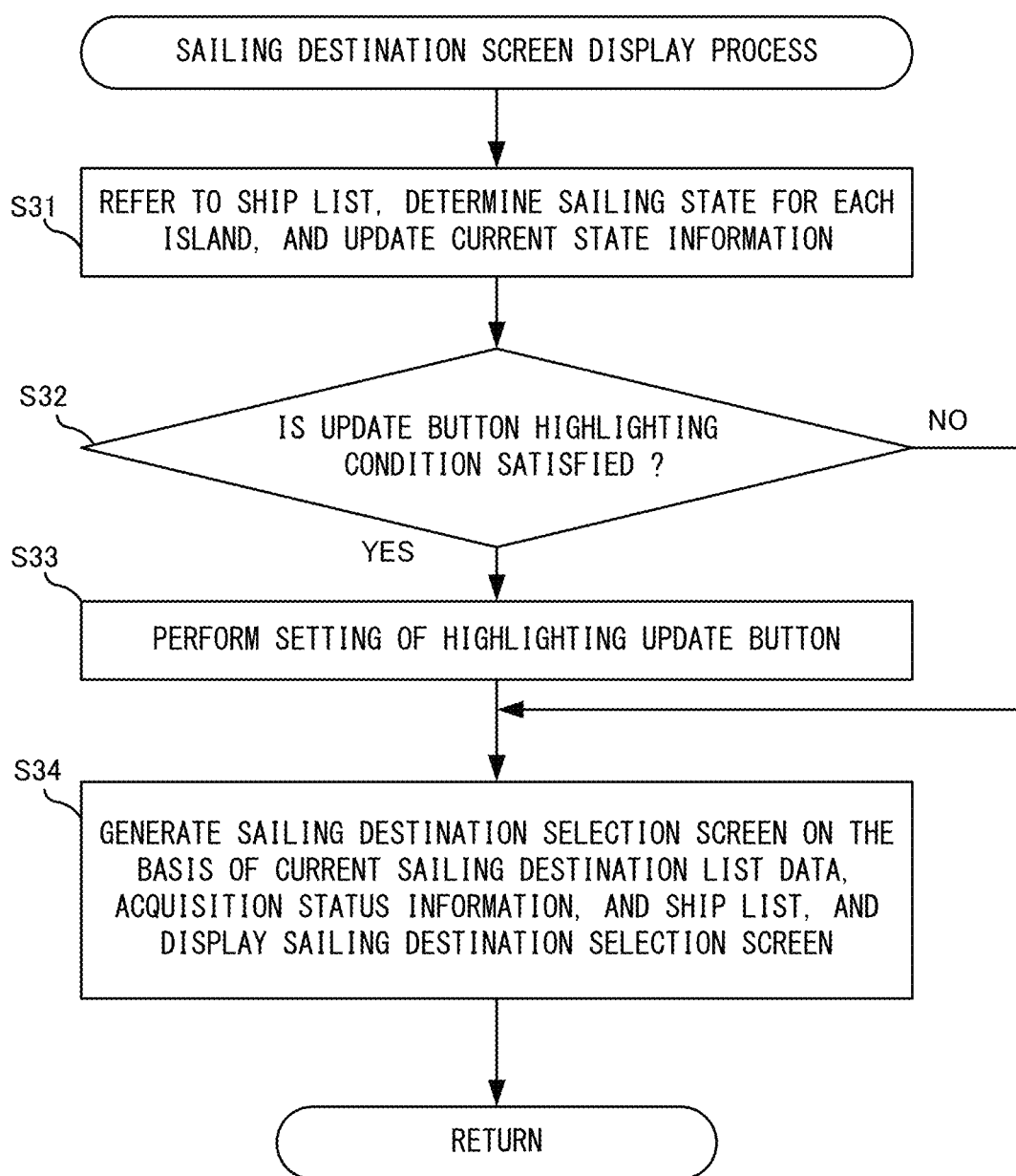
FIG. 17 is a flowchart showing a sailing destination screen display process in detail.

First, in step S1, the processor 121 executes a sailing destination screen display process. The sailing destination screen display process is a process for displaying the sailing destination selection screen shown in FIG. 2. FIG. 17 is a flowchart showing the sailing destination screen display process in detail. First, in step S31, the processor 121 refers to the ship list data 505 and updates the current state information 542 of each ship as appropriate. Specifically, the processor 121 determines whether there is a ship that is in the middle of sailing and for which the waiting time has elapsed. That is, the processor 121 determines whether there is a ship that has newly returned to port. Then, if there is a ship that has newly returned to port, the processor 121 updates the current state information of the ship from "middle of sailing" to "already returned to port".

Next, in step S32, the processor 121 determines whether a predetermined condition for highlighting the above-described update button 203 is satisfied. As a result of the determination, if the condition is satisfied (YES in step S32), in step S33, the processor 121 performs display setting for highlighting the update button 203. If the condition is not satisfied (NO in step S32), the process in step S33 is skipped, and the processor 121 proceeds to the next process.

Next, in step S34, the processor 121 generates a sailing destination selection screen on the basis of the current sailing destination list data 504, the given status information 534 of each island, the ship list data 505, and the display setting content of the update button 203, and displays the sailing destination selection screen on the display section 124. Specifically, the processor 121 sets the island objects 202 to be displayed, on the basis of the current sailing destination list data 504. In addition, the processor 121 also appropriately sets the display content of each placard image 206 on the basis of the island database 503. Furthermore, the processor 121 determines the presence/absence of an island for which sailing is being carried out, and the presence/absence of an island from which a return to port has been already made, on the basis of the ship list data 505, and appropriately sets a content to be displayed in the status display area 207 (see FIG. 3). Moreover, for each island for which sailing is not being carried out or from which a return to port has not been already made, the processor 121 appropriately sets a content to be displayed in the status display area 207, on the basis of the given status information 534 of each island. Moreover, if highlighting has been set for the update button 203, the processor 121 highlights the update button 203 as appropriate. Then, the processor 121 generates a sailing destination selection screen in which these settings are reflected, and displays the sailing destination selection screen. This is the end of the sailing destination screen display process.

Referring back to FIG. 16, next, in step S2, the processor 121 acquires the operation data 510.

Next, in step S3, the processor 121 determines whether the content of the operation indicated by the operation data 510 is an operation for selecting the island object 202 for which a departure has not been made. As a result of the determination, if the island object 202 for which a departure has not been made has been selected (YES in step S3), the processor 121 executes a departure process in step S4. The departure process is a process regarding operations from the above-described departure preparation to departure decision. That is, a process for loading the above cargo into a ship, a process of determining whether the above condition for first giving is satisfied, etc., are performed. Thereafter, the processor 121 returns to step S1 and repeats the process. Regarding designation of the ship to be used for this departure, a ship may be automatically selected from among ships in a "free" state, or it may be possible for the user to manually designate a ship.

Figure 18:
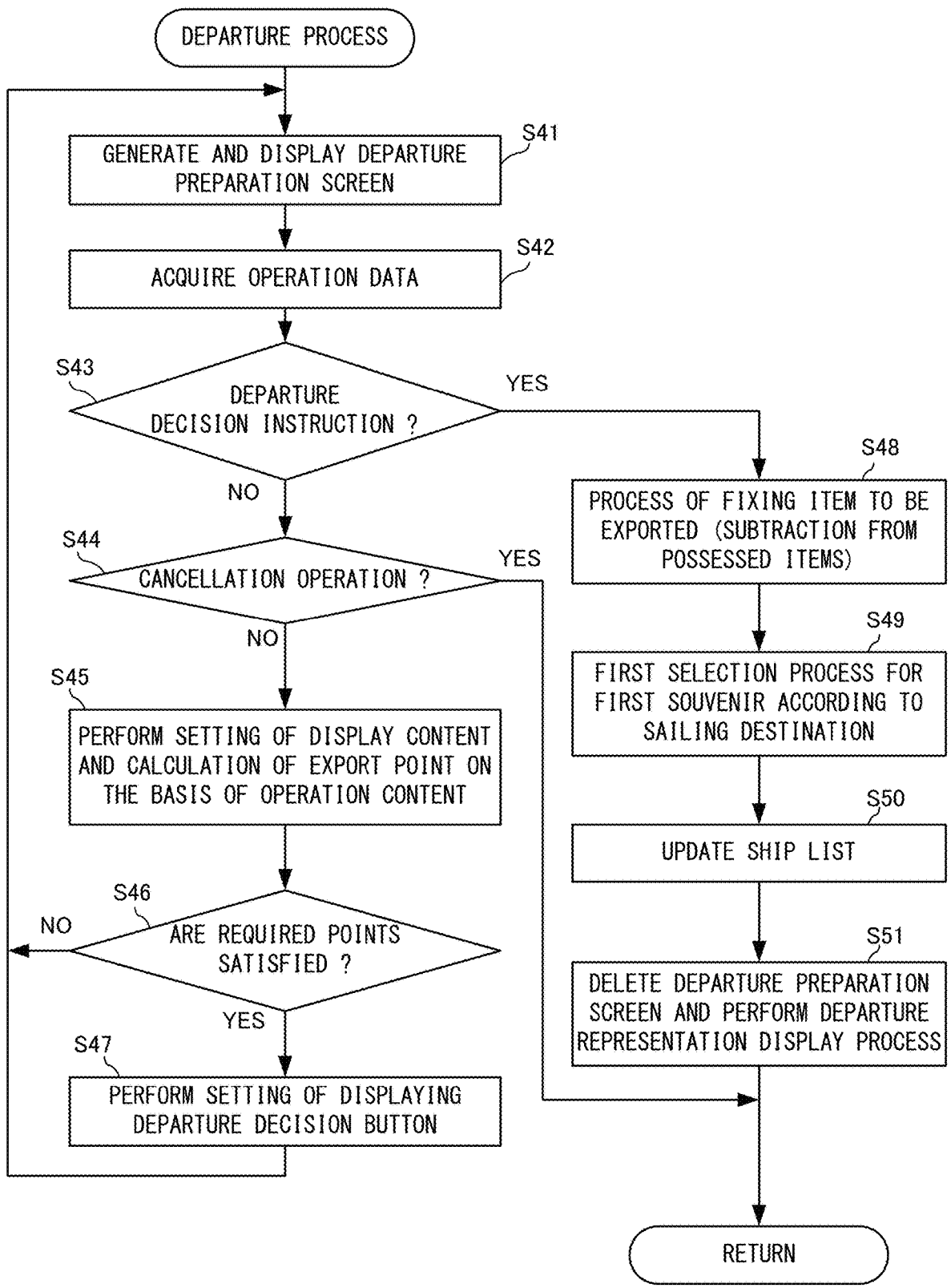
FIG. 18 is a flowchart showing a departure process in detail.

FIG. 18 is a flowchart showing the departure process in detail. First, in step S41, the processor 121 generates and displays the departure preparation screen shown in FIG. 7. Next, in step S42, the processor 121 acquires the operation data 510. In subsequent step S43, the processor 121 determines whether the content indicated by the operation data 510 is an instruction of departure decision. As described above, in order to make departure decision possible, the above export point needs to satisfy the required points. If the required points are not satisfied, a state where an instruction of departure decision itself cannot be made (a state where a button for departure decision is yet to be displayed) is obtained.

As a result of the determination, if the content is not an instruction of departure decision (NO in step S43), the processor 121 determines subsequently in step S44 whether an operation for cancelling departure preparation has been performed. If the cancellation operation has been performed (YES in step S44), the processor 121 deletes the departure preparation screen and ends the departure process. On the other hand, if the cancellation operation has not been performed (NO in step S44), in step S45, the processor 121 performs export point calculation and display setting of a departure preparation screen in which the operation content is reflected, on the basis of the operation content.

Next, in step S46, the processor 121 determines whether the export point satisfies the required points for the island selected as the sailing destination this time. As a result of the determination, if the required points are satisfied (YES in step S46), in step S47, the processor 121 performs a process of changing the "load into ship" button 215 shown in FIG. 7 to the "depart" button (not shown). Accordingly, a state where it can be determined as YES in step S43 is obtained. Then, the processor 121 returns to step S41. On the other hand, if the required points are yet to be satisfied (NO in step S46), the processor 121 returns to step S41 and repeats the process. At this time, if a return is made to a state where a departure becomes impossible due to reduction of cargo or the like after a departure becomes possible, the processor 121 also performs setting of returning the display of the "depart" button to the "load into ship" button 215.

On the other hand, as a result of the determination in step S43, if an instruction of departure decision has been made (YES in step S43), in step S48, the processor 121 performs a process of fixing items to be exported. Specifically, the processor 121 executes a process of subtracting the number of in-game contents determined to be exported this time from the possessed content data 508.

Next, in step S49, the processor 121 executes the second selection process for the first souvenir according to the sailing destination island. Next, in step S50, the processor 121 updates the ship list data 505 such that the above contents are reflected therein. That is, for the ship to be used for the departure this time, the processor 121 sets the current state information 542 to "middle of sailing", and sets the selection result in step S49, in the selection result information 545. Furthermore, the processor 121 sets the current time as the departure start time 544.

Next, in step S51, the processor 121 deletes the departure preparation screen. In addition, at this time, a predetermined representation showing a state where the ship is departing may be displayed. Thereafter, the departure process ends.

Referring back to FIG. 16, as a result of the determination in step S3, if any island object 202 for which a departure has not been made has not been selected (NO in step S3), the processor 121 determines subsequently in step S5 whether any island object 202 for which sailing is being carried out has been selected. As a result of the determination, if an island object 202 for which sailing is being carried out has been selected (YES in step S5), the processor 121 executes a time shortening confirmation process in step S6 and then returns to the process in step S1. The time shortening confirmation process is a process for inquiring whether to cause the ship to immediately return to port by using "tickets" as described with reference to FIG. 8.

Figure 19:
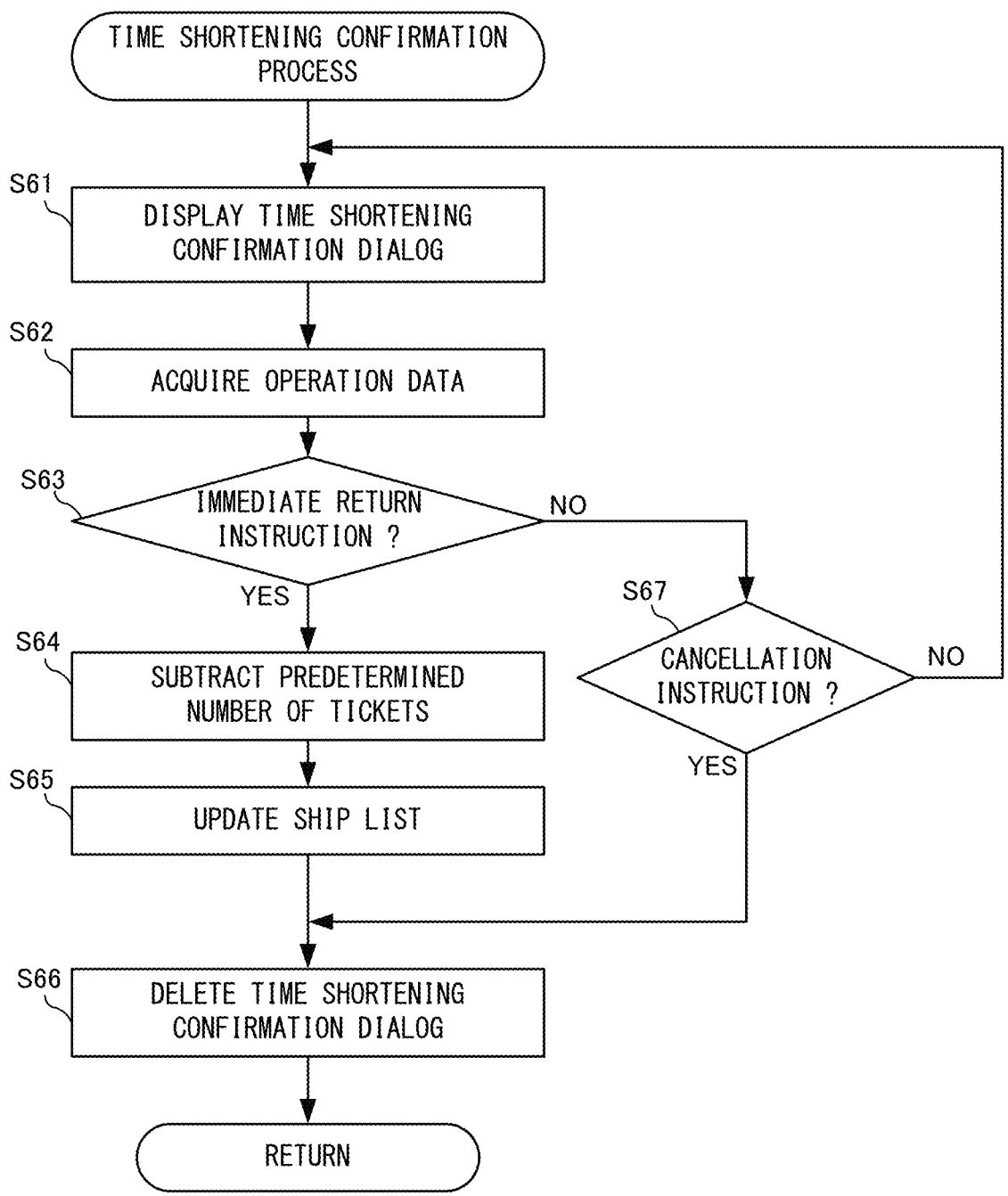
FIG. 19 is a flowchart showing a time shortening confirmation process in detail.

FIG. 19 is a flowchart showing the time shortening confirmation process in detail. First, in step S61, the processor 121 generates and displays the time shortening confirmation dialog 216 as shown in FIG. 8. Next, in step S62, the processor 121 acquires the operation data 510 and determines whether the operation content is an instruction to make an immediate return to port (the OK button 217 in FIG. 8 has been selected) in subsequent step S63. As a result of the determination, if the operation content is an instruction for an immediate return to port (YES in step S63), the processor 121 subtracts a predetermined number of "tickets" from the possessed ticket data 507 in step S64.

Next, in step S65, the processor 121 updates the ship list. That is, the processor 121 sets "already returned to port" in the current state information 542 of the ship that is instructed to immediately return to port this time.

Next, in step S66, the processor 121 deletes the time shortening confirmation dialog 216. Then, the processor 121 ends the time shortening confirmation process.

On the other hand, as a result of the determination in step S63, if the operation content is not an instruction for an immediate return to port (NO in step S63), the processor 121 determines in step S67 whether a cancellation instruction has been made. If the cancellation instruction has not been made (NO in step S67), the processor 121 returns to step S61 and repeats the process. If the cancellation instruction has been made (YES in step S67), the processor 121 advances the processing to step S66, deletes the time shortening confirmation dialog, and also ends the time shortening confirmation process.

Referring back to FIG. 16, as a result of the determination in step S5, if any island object 202 for which sailing is being carried out has not been selected (NO in step S5), the processor 121 determines subsequently in step S7 whether the island object 202 from which a return to port has been already made has been selected. As a result of the determination, if such an island object 202 has been selected (YES in step S7), the processor 121 executes a souvenir acquisition process in step S8 and then returns to the process in step S1.

Figure 20:
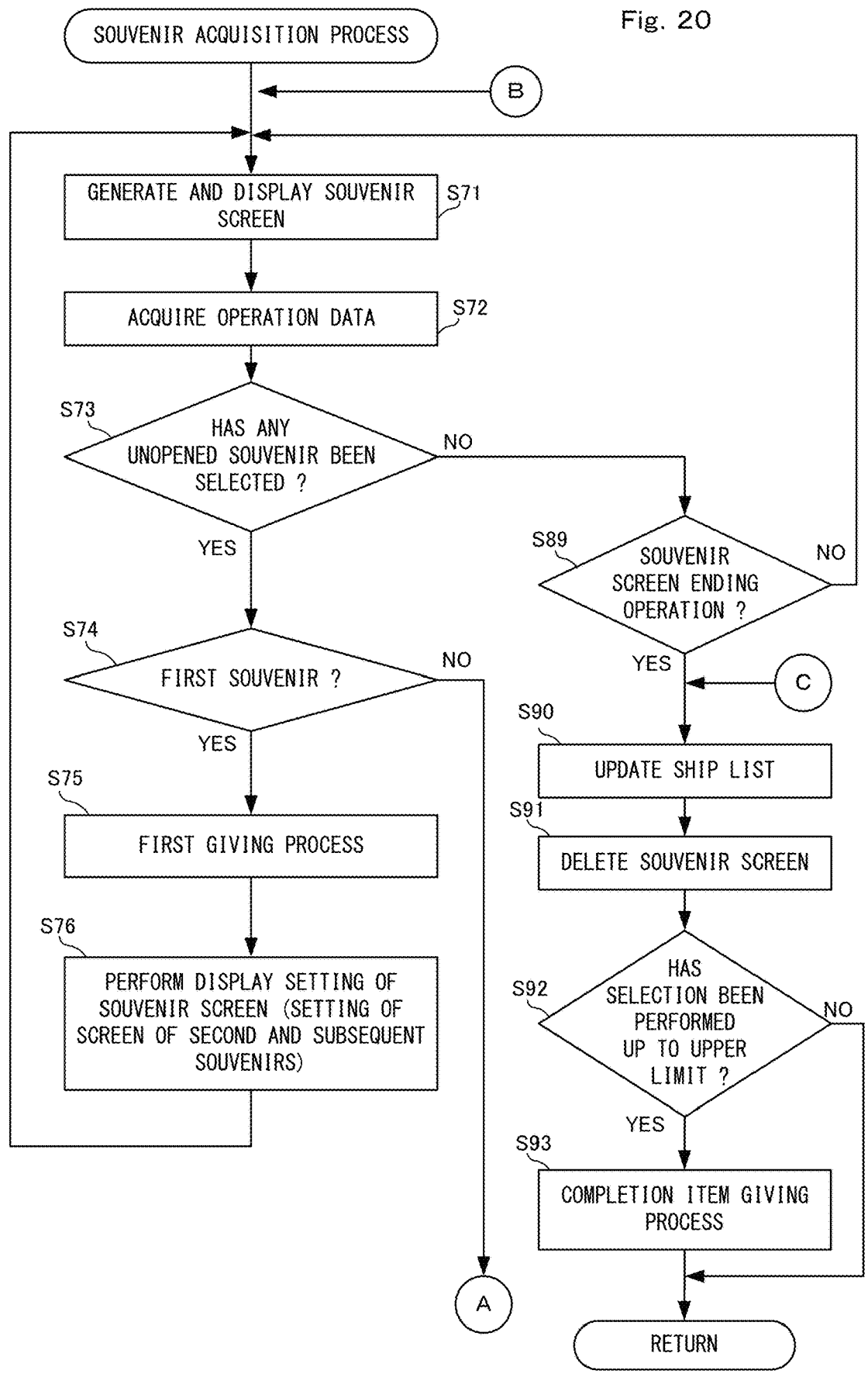
FIG. 20 is a flowchart showing a souvenir acquisition process in detail.
Figure 21:
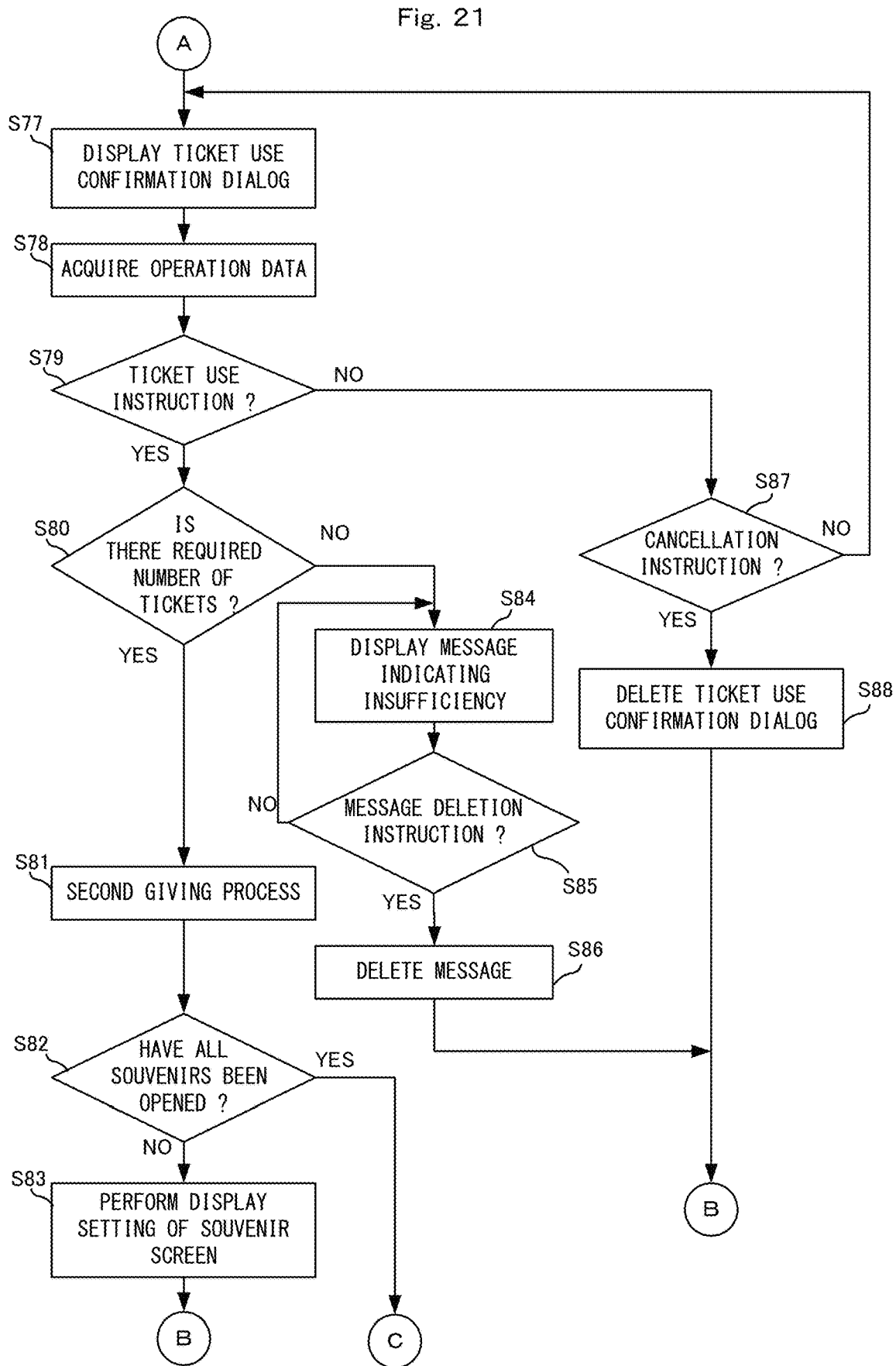
FIG. 21 is a flowchart showing the souvenir acquisition process in detail.

FIGS. 20 and 21 are flowcharts showing the souvenir acquisition process in detail. First, in step S71, the processor 121 generates and displays the above-described souvenir acquisition screen. Specifically, first, the processor 121 determines the number of souvenirs to be displayed. In this example, six souvenirs are basically displayed, however, a number less than six can be determined depending on the number of selection target contents remaining in the limited-type selection target group as described above. In addition, in another exemplary embodiment, the number of souvenirs may be determined by a predetermined selection process. Then, after the number of souvenirs is determined, the processor 121 further determines an appearance image for each souvenir. The appearance image may be determined by a predetermined selection process. At this stage, any souvenir is yet to be opened. Therefore, as a result of the above process, a screen for urging the user to open the first souvenir as shown in FIG. 9 is generated and displayed.

Next, in step S72, the processor 121 acquires the operation data 510. In subsequent step S73, the processor 121 determines whether the operation content indicated by the operation data 510 is an operation for selecting any unopened souvenir object 221. As a result of the determination, if any unopened souvenir object 221 has been selected (YES in step S73), the processor 121 determines subsequently in step S74 whether opening of the selected souvenir object 221 corresponds to opening of the first souvenir. As a result of the determination, if opening of the selected souvenir object 221 corresponds to opening of the first souvenir (YES in step S74), the processor 121 executes a first giving process in step S75. Specifically, the processor 121 performs a process of adding an in-game content specified on the basis of the selection result information 545 of the ship that is the current operation target, to the possessed content data 508. Furthermore, the processor 121 updates the given status information 534 of the island that is the sailing destination this time. That is, the processor 121 updates the given status information 534 such that the in-game content given to the user this time is excluded from the selection target contents. In the exemplary embodiment, the processor 121 performs a process of decreasing the stock number of the corresponding selection target content by one.

Next, in step S76, the processor 121 sets display contents of a souvenir acquisition screen in which opening of the first souvenir is reflected. Specifically, the processor 121 performs display setting such that the opened first souvenir object 221 is grayed out. In addition, the processor 121 also performs setting of superimposing an image indicating the in-game content given to the user, on the souvenir object 221. Furthermore, setting for displaying a message to inquire whether to acquire the second and subsequent souvenirs and an image indicating the number of the "tickets" possessed as shown in FIG. 10, is also performed. Thereafter, the processor 121 returns to step S71 and repeats the process. As a result, in the process in step S71 after the first souvenir is opened, a screen for acquiring the second and subsequent souvenirs is displayed as shown in FIG. 10.

On the other hand, as a result of the determination in step S74, if it is determined that the selected souvenir object 221 is not the first souvenir (NO in step S74), in step S77 in FIG. 21, the processor 121 displays the "ticket" consumption confirmation dialog 223 as shown in FIG. 11. Next, in step S78, the processor 121 acquires the operation data 510. In subsequent step S79, the processor 121 determines whether an operation for using the "tickets" has been performed. As a result of the determination, if the operation for using the "tickets" has been performed (YES in step S79), in step S80, the processor 121 refers to the possessed ticket data 507 and determines whether the user possesses the required number of "tickets". That is, the processor 121 determines whether the condition for second giving is satisfied. As a result, if the required number of "tickets" is insufficient (NO in step S80), in step S84, the processor 121 appropriately displays a message indicating that there are insufficient tickets, and waits for a user's operation (for example, a message box including only an OK button is displayed). Thereafter, in step S85, the processor 121 acquires the operation data 510 and determines whether an instruction to delete the above message has been made. As a result of the determination, if the deletion instruction has not been made (NO in step S85), the processor 121 returns to step S84 and repeats the process. If the deletion instruction has been made (YES in step S85), the processor 121 deletes the message in step S86 and returns to step S71.

On the other hand, as a result of the determination in step S80, if the user possesses the required number of "tickets" (YES in step S80), the processor 121 executes a second giving process in step S81. Specifically, first, the processor 121 subtracts a predetermined number of "tickets" from the possessed ticket data 507. In this example, five tickets are basically subtracted, but, if souvenirs are continuously opened as described above, the required number of tickets is reduced by one each time a souvenir is opened. Furthermore, the processor 121 performs the second selection process for an in-game content to be given to the user, and performs a process of adding an in-game content selected to the possessed content data 508. In addition, the processor 121 updates the given status information 534 such that the given in-game content is excluded from the subsequent selection targets (specifically, decreases the stock number).

Next, in step S82, the processor 121 determines whether all the souvenirs have been opened. As a result of the determination, if all the souvenirs have been opened (YES in step S82), the processor 121 advances the processing to step S90 described later. On the other hand, if any unopened souvenir remains (NO in step S82), next, in step S83, the processor 121 performs display setting of the souvenir acquisition screen such that the souvenir object 221 opened this time is grayed out. In addition, the processor 121 also performs setting of superimposing an image indicating the in-game content given to the user, on the souvenir object 221. Accordingly, each time an opening operation is performed, the opened souvenir object 221 is grayed out. Thereafter, the processor 121 returns to step S71 and repeats the process.

On the other hand, as a result of the determination in step S79, if the operation for using the "tickets" has not been performed (NO in step S79), the processor 121 determines in step S87 whether an operation for cancelling opening of the second and subsequent souvenirs has been performed. Specifically, the processor 121 determines whether a tap operation has been performed on the "cease" button 225 in the "ticket" consumption confirmation dialog 223 in FIG. 11. If this operation has not been performed (NO in step S87), the processor 121 returns to step S77 and repeats the process. If this operation has been performed (YES in step S87), the processor 121 deletes the "ticket" consumption confirmation dialog 223 in step S88. Then, the processor 121 returns to step S71 and repeats the process.

Referring back to FIG. 20, the case where any unopened souvenir has not been selected in step S73 (NO in step S73) will be described next. In this case, in step S89, the processor 121 determines whether an operation for ending the souvenir acquisition screen has been performed. Specifically, the processor 121 determines whether a tap operation has been performed on the "end" button 22 in FIG. 10. As a result of the determination, if the ending operation has not been performed (NO in step S89), the processor 121 returns to step S71 and repeats the process. On the other hand, if the ending operation has been performed (YES in step S89), in step S90, the processor 121 updates the ship list data 505 such that reception of the souvenir is reflected. Specifically, the processor 121 performs a process of changing the current state information 542 of the ship that is the current operation target, from "already returned to port" to "free".

Next, in step S91, the processor 121 deletes the souvenir acquisition screen. Next, in step S92, the processor 121 determines whether the second selection has been performed up to the upper limit for the limited-type selection target group of the island that is the current operation target. As a result of the determination, if the second selection has been performed up to the upper limit (YES in step S92), in step S93, the processor 121 gives the completion item corresponding to the island, to the user. That is, the processor 121 performs a process of adding the completion item to the possessed content data 508. On the other hand, if the second selection has not been performed up to the upper limit (NO in step S92), the process in step S93 is skipped. Thereafter, the souvenir acquisition process ends.

Referring back to FIG. 16, as a result of the determination in step S7, if any island object 202 from which a return to port has been already made has not been selected (NO in step S7), next, in step S9, the processor 121 determines whether the update button 203 has been selected. As a result of the determination, if the update button 203 has been selected (YES in step S9), the processor 121 executes a sailing destination update process in step S10 and then returns to the process in step S1.

Figure 22:
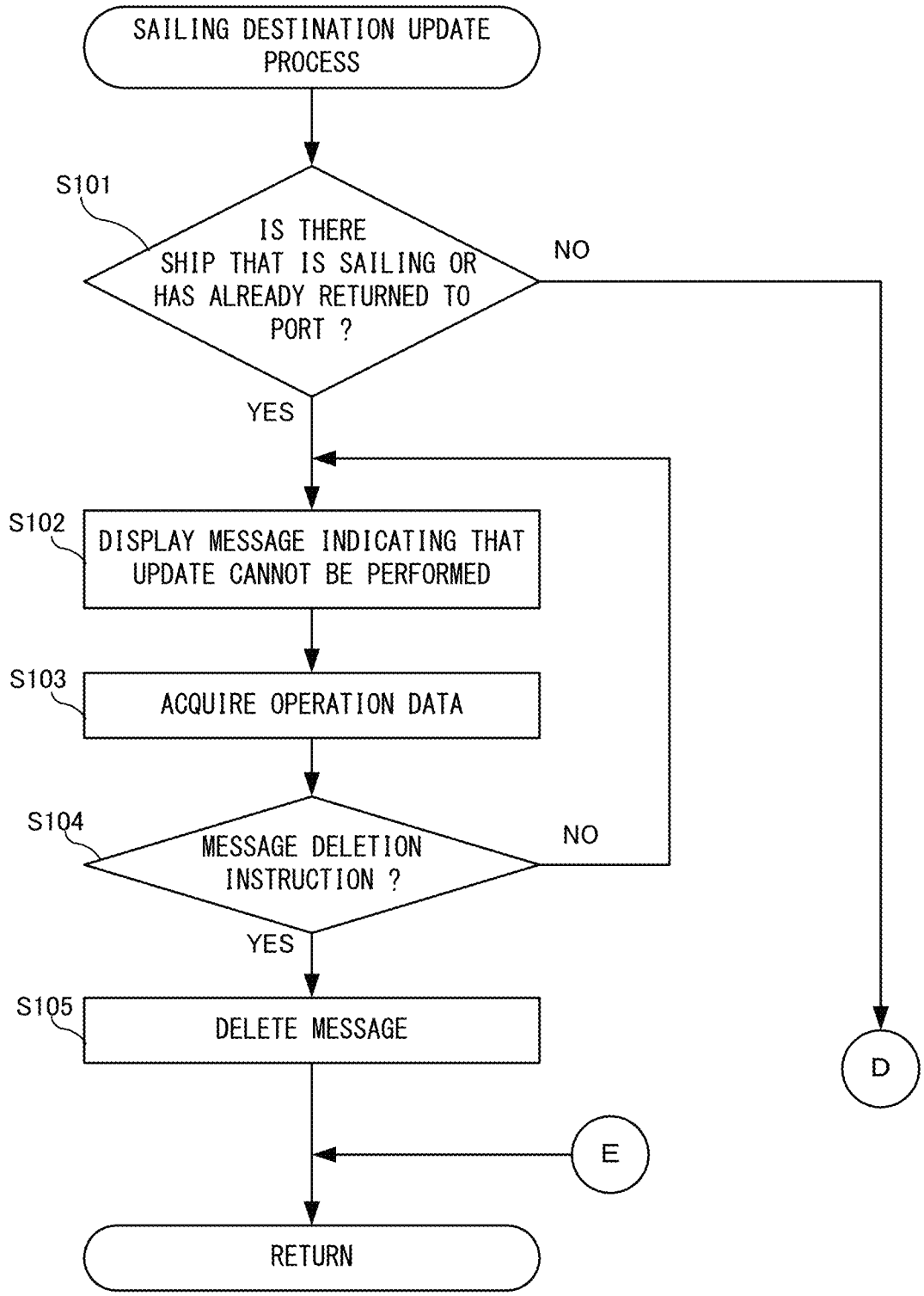
FIG. 22 is a flowchart showing a sailing destination update process in detail.
Figure 23:
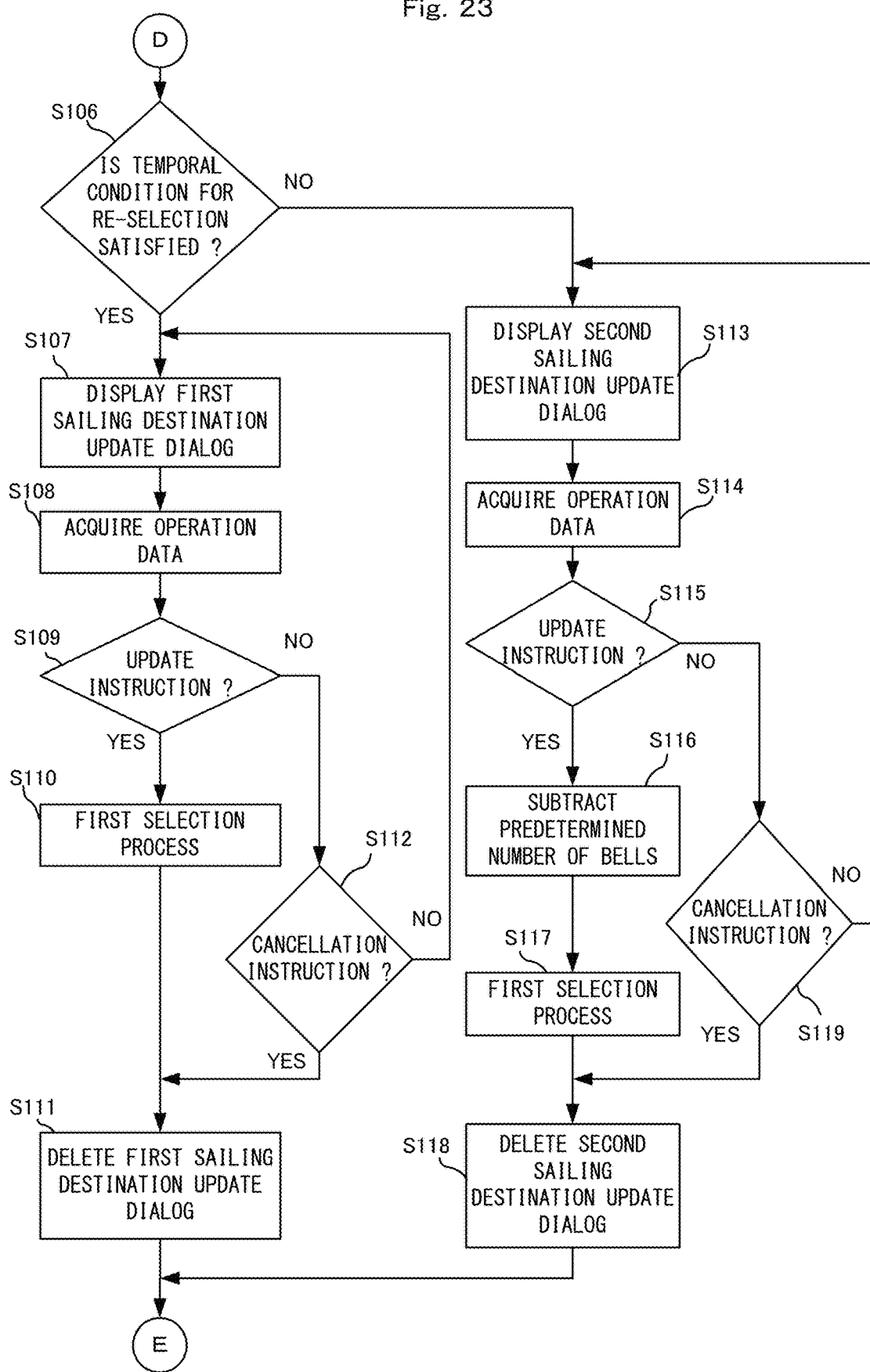
FIG. 23 is a flowchart showing the sailing destination update process in detail.

FIGS. 22 and 23 are flowcharts showing the sailing destination update process in detail. First, in step S101 in FIG. 22, the processor 121 refers to the ship list data 505 and determines whether there is a ship in the middle of sailing or a ship that has already returned to port (for which a souvenir has not been opened). As a result of the determination, if there is any of such ships (YES in step S101), in step S102, the processor 121 displays a message (not shown) indicating that update cannot be performed due to, for example, the presence of the ship in the middle of sailing or for which a souvenir has not been opened. Next, in step S103, the processor 121 acquires the operation data 510. In subsequent step S104, the processor 121 determines whether an instruction to delete the message display has been made. As a result of the determination, if the deletion instruction has not been made (NO in step S104), the processor 121 returns to step S102 and repeats the process. If the deletion instruction has been made (YES in step S104), the processor 121 deletes the message display in step S105 and ends the sailing destination update process.

On the other hand, as a result of the determination in step S101, if there is no ship in the middle of sailing or there is no ship that has already returned to port, that is, if all the ships are in a "free" state (NO in step S101), the processor 121 determines in step S106 in FIG. 23 whether a temporal condition for making update of the sailing destinations (re-selection) possible is satisfied. In the exemplary embodiment, the processor 121 determines whether a predetermined time period has elapsed from the previous update operation. If the predetermined time period has elapsed, the processor 121 determines that the temporal condition is satisfied.

As a result of the determination, if the temporal condition is satisfied (YES in step S106), next, in step S107, the processor 121 generates and displays the first sailing destination update confirmation dialog 210 as shown in FIG. 5. Next, in step S108, the processor 121 acquires the operation data 510. In subsequent step S109, the processor 121 determines whether an instruction to update the sailing destination has been made. As a result of the determination, if the update instruction has been made (YES in step S109), in step S110, the processor 121 performs the above first selection process and determines again islands to be presented as sailing destinations. In this example, as a result of performing the first selection again, five islands are selected. Then, the processor 121 updates the current sailing destination list data 504 on the basis of the selection result. At this time, as described above, the island for which the second selection has been performed up to the upper limit may be excluded from the targets of the first selection in this process, or may be set as a target of the first selection after the acquisition status of the selection target contents of this island is initialized.

On the other hand, as a result of the determination in step S109, if the update instruction has not been performed (NO in step S109), the processor 121 determines subsequently in step S112 whether a cancellation instruction has been made. As a result of the determination, if the cancellation instruction has been made (YES in step S112), the processor 121 advances the processing to step S111 described later. If the cancellation instruction has not been made (NO in step S112), the processor 121 returns to step S107 and repeats the process.

Next, in step S111, the processor 121 deletes the first sailing destination update confirmation dialog 210 displayed in step S107. Then, the sailing destination update process ends.

On the other hand, as a result of the determination in step S106, if the temporal condition is not satisfied (NO in step S106), next, in step S113, the processor 121 generates and displays the second sailing destination update confirmation dialog 214 as shown in FIG. 6. Next, in step S114, the processor 121 acquires the operation data 510. In subsequent step S115, the processor 121 determines whether an instruction to update the sailing destinations has been made. As a result of the determination, if the update instruction has been made (YES in step S115), in step S116, the processor 121 performs a process of subtracting a predetermined number of "bells" from the possessed bell data 506. Next, in step S117, the processor 121 performs the first selection process and determines again islands to be presented as sailing destinations. Then, the processor 121 updates the current sailing destination list data 504 on the basis of the selection result.

On the other hand, as a result of the determination in step S115, if the update instruction has not been made (NO in step S115), the processor 121 determines subsequently in step S119 whether a cancellation instruction has been made. As a result of the determination, if the cancellation instruction has been made (YES in step S119), the processor 121 advances the processing to step S118 described later. If the cancellation instruction has not been made (NO in step S119), the processor 121 returns to step S113 and repeats the process.

Next, in step S118, the processor 121 deletes the second sailing destination update confirmation dialog 214 displayed in step S113. Then, the sailing destination update process ends.

Referring back to FIG. 16, as a result of the determination in step S9, if the update button 203 has not been selected (NO in step S9), the processor 121 determines subsequently in step S11 whether the ending operation has been performed. As a result of the determination, if the ending operation has not been performed (NO in step S11), in step S12, the processor 121 executes other game processing as appropriate on the basis of the operation content, and then returns to the process in step S1. On the other hand, if the ending operation has been performed (YES in step S11), the processor 121 ends the cargo ship game processing.

This is the end of the detailed description of the cargo ship game processing.

As described above, in the exemplary embodiment, in the above cargo ship game, the user satisfies the condition for a departure and causes a ship to depart for a predetermined island and return to port. Accordingly, the user can acquire a chance of acquiring an in-game content, a plurality of times, with a predetermined number of times as an upper limit. Among the plurality of times of chances, at the first chance, it is possible to acquire an in-game content without any compensation (first giving), and, acquisition of an in-game content (second giving) at each of the second and subsequent chances is performed in exchange for a predetermined compensation. Here, the in-game content is selected by the second selection, but the second selection is performed for the above-described limited-type selection target group. That is, when the second selection is performed a number of times that is the upper limit, it is possible to acquire all the selection target contents in the limited-type selection target group. In other words, by repeating second giving in exchange for a compensation each time a return to port is made, the user can acquire many in-game contents in a short period due to reduction in the number of times of a departure, and can also finally reliably acquire the in-game contents. Therefore, with limited chances of the second selection obtained by one time of a departure to a return to port, the significance of trying the above second giving in exchange for a compensation can be enhanced, and the effect enjoyed by the user in exchange for the compensation can be enhanced. Furthermore, for example, assuming the case of returning to port from an island from which an item with a high rarity can be acquired and the case of returning to port from an island from which an item with a high rarity cannot be acquired, it is also possible to provide the user with room for choices to play such that, in the latter case, only first giving is performed from the viewpoint of saving "tickets", and, in the former case, second giving is used in order to quickly acquire the item with a high rarity.

In the above exemplary embodiment, the limited-type selection target groups (islands) presented as sailing destinations can be changed by performing an operation on the update button 203. Accordingly, a limited-type selection target group that has been presented so far may no longer be presented as a result of an update operation. In addition, such a limited-type selection target group may be presented again as a result of a further update operation. For the limited-type selection target group that is presented again after not being presented as described above, in the above exemplary embodiment, the second selection can be continued with adoption of the previous given status of each in-game content. Accordingly, the update operation allows various limited-type selection target groups to be enjoyed and also allows the chances of acquiring the selection target contents in each limited-type selection target group to be ensured, so that the entertainment characteristics of the selection game can be enhanced further.

[Modifications]

In the above exemplary embodiment, the case where the game processing is performed by a single information processing apparatus has been described as an example. However, regarding the subject that performs the processing as described above, a configuration other than the above configuration may be adopted. For example, in another exemplary embodiment, an information processing system (game system), in which an information processing apparatus and a predetermined server are configured to be communicable with each other and the various kinds of data and the information processing described above are partially stored and executed at the predetermined server, may be adopted. In this case, the server side may be a server system configured from a plurality of information processing apparatuses and processing to be performed on the server side may be divided and performed by the plurality of information processing apparatuses. In the case of such an information processing system, for example, data about users who use the above game is stored in the server on a user-by-user basis. Then, at the start of the game, a user is caused to perform a process of logging in to the server, necessary data is downloaded from the server onto the information processing terminal 102, and the information processing terminal 102 and the predetermined server cooperate to perform the above-described information processing. In this case, various kinds of the selection processes described above may be performed for each user. In addition, the selection processes may be performed on the information processing terminal side, or may be performed on the server side. For example, the first selection process for sailing destinations to be presented in the above sailing destination list, the second selection process for each souvenir, and transmission of the selection results to the information processing terminal may be performed on the server side. Meanwhile, a process of generating a game screen on the basis of reception of various operations and various processing results including the results of the selection processes on the server side may be mainly performed on the information processing terminal side.

In the above exemplary embodiment, regarding the update operation for sailing destinations, the case of performing a manual update operation by the user has been taken as an example. In another exemplary embodiment, update may be automatically performed. For example, automatic update may be performed once every 24 hours.

In the above example, regarding the above states such as "middle of sailing" and "already returned to port", management is performed on a ship basis by using the ship list data 505, but, in another exemplary embodiment, management does not have to be performed on a ship basis, and, for example, management may be performed on an island basis. That is, each island may have information indicating a state of either one of "middle of sailing", "already returned to port", and "free". For example, information that is an island ID may be used instead of the ship ID 541. Data including the current state information 542, the departure start time 544, the selection result information 545, etc., may be used for each island. In the case of this configuration, the above-described process for designating a ship to be used for a departure is unnecessary.

The islands described in the above exemplary embodiment are used as islands that can be constantly presented, and, in addition to such islands, an island that is presented for a limited time may also be presented to the user. For example, by the user performing a swipe operation on the sailing destination selection screen shown in FIG. 2, the page maybe switched, and an island that appears for a limited time may be displayed. In this case, in a screen in which the time-limited island is displayed, the above-described update button 203 does not have to be displayed. That is, the user may not be allowed to update the presented contents for the time-limited island. Accordingly, the chances for the user to acquire contents for the time-limited island can be ensured.

In the above exemplary embodiment, regarding the temporal condition for updating the sailing destinations, the basic condition is an elapse of the predetermined time period, and the additional condition is consumption of "bells". The basic condition and the additional condition may be reversed. In addition, not only the temporal condition but also another condition may be used. For example, instead of the above temporal condition, clearing a predetermined mini game may be used as a condition.

In the above example, the waiting time from a departure to a return to port is different for each island that is a sailing destination. However, the waiting time is not limited thereto, and the same waiting time many be set for each island. In addition, the waiting time may be changed according to the contents of the cargo.

For updating the sailing destinations, shortening the time to a return to port, and opening the second and subsequent souvenirs, the game currency is consumed in the above example. The exemplary embodiment is not limited thereto, and predetermined in-game items may be reduced/consumed.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A processing system comprising:
   at least one processor, the at least one processor included in the processing system singly or in cooperation executing:
   storing, in a memory, a plurality of content groups and a limited number of content items that are to be selection targets for each of the content groups, wherein each of the content items are in-game virtual content usable by a user in connection a video game that includes a virtual game space, wherein each of
the plurality of content groups include different sets
of the content items;
determining some of the plurality of content groups
stored in the memory as selectable target groups by
a first selection;
selecting, on the basis of a user's operation, at least one
content group from among the selectable target
groups;
executing a second selection for the content items that
are to be the selection targets for the selected content
group, on the basis of a user's operation;
giving a selected content item determined by the second selection to the user;
accepting instruction(s), provided by the user, to use the
selected content item within the video game that
includes the virtual game space;
storing, in the memory, a given status of each content
item in the content group for which the second
selection is executed, such that the given selected
content item is excluded from the selection targets in
the content group;
determining some of the plurality of content groups as
the selectable target groups by the first selection
again when a predetermined condition is satisfied;
retaining, in the memory, the given status of each
content item in each content group regardless of
which content groups are determined as the selectable target groups by the first selection; and
based on all of the content items in at least one content
group having a given status that excludes all of the
content items in the least one content group as being
selectable, updating the given status of at least some
of the content items in the at least one content group
to be valid selection target again.

2. The processing system according to claim 1, wherein, when a predetermined user's operation is performed after a predetermined period elapses from previous determination of the selectable target groups, it is determined that the predetermined condition is satisfied, and the selectable target groups are determined from among the plurality of content groups.

3. The processing system according to claim 2, wherein until the predetermined user's operation is performed, determination of the selectable target groups from among the plurality of content groups is not performed again.

4. The processing system according to claim 1, wherein, after an elapse of a predetermined period from previous determination of the selectable target groups as the predetermined condition, the selectable target groups are determined again from among the plurality of content groups regardless of presence/absence of a user's operation.

5. The processing system according to claim 1, wherein, even when the predetermined condition is not satisfied but an additional condition different from the predetermined condition is satisfied, the selectable target groups are determined again from among the plurality of content groups.

6. The processing system according to claim 5, wherein the additional condition is consumption of predetermined virtual currency.

7. The processing system according to claim 1, wherein, when all the selection targets of at least one content group among the plurality of content groups are excluded, the content group is stored in the memory such that the content group is excluded from selection targets of the first selection.

8. The processing system according to claim 1, wherein a content item determined by the second selection is given to the user after a predetermined waiting time elapses, and, even before the predetermined waiting time elapses, when the user consumes a predetermined item, the content item determined by the second selection is given to the user, and
execution of determination of the selectable target groups by the first selection again is limited in a period from an instruction to execute the second selection for the content group to execution of the giving according to the instruction.

9. The processing system according to claim 8, wherein, after a predetermined waiting time elapses from an instruction to execute the second selection for the content group, a content item determined by the second selection is given to the user, and even before the predetermined waiting time elapses, when the user consumes a predetermined item, the content item determined by the second selection is given to the user.

10. A processing apparatus comprising:
at least one processor configured to execute computer executable instructions that cause the as least one processor to perform operations including:
storing, in a memory, a plurality of content groups and a limited number of content items that are to be selection targets for each of the content groups, wherein each of the content items are in-game virtual content usable by a user in connection a video game that includes a virtual game space, wherein each of the plurality of content groups include different sets of the content items;
determining some of the plurality of content groups stored in the memory as selectable target groups by a first selection;
selecting at least one content group from among the selectable target groups on the basis of a user's operation;
executing a second selection for the content items that are to be the selection targets for the selected content group, on the basis of a user's operation;
giving a selected content item determined by the second selection to the user;
accepting instruction(s), provided by the user, to use the selected content item within the video game that includes the virtual game space;
storing, in the memory, a given status of each content item in the content group for which the second selection is executed, such that the given selected content item is excluded from the selection targets in the content group;
determining some of the plurality of content groups as the selectable target groups by the first selection again when a predetermined condition is satisfied;
retaining, in the memory, the given status of each content item in each content group regardless of which content groups are determined as the selectable target groups by the first selection;
based on all of the content items in at least one content group having a given status that excludes all of the content items in the least one content group as being selectable, updating the given status of at least some of the content items in the at least one content group to be valid selection target again.

11. A computer-readable non-transitory storage medium having stored therein a game program for causing a computer of a processing apparatus to perform game processing of giving a predetermined content to a user through a selection, the game program causing the computer to:

store, in a memory, a plurality of content groups and a limited number of content items that are to be selection targets for each of the content groups, wherein each of the content items are in-game virtual content usable by a user in connection a video game that includes a virtual game space, wherein each of the plurality of content groups include different sets of the content items;

determine some of the plurality of content groups stored in the memory as selectable target groups by a first selection;

select at least one content group from among the selectable target groups on the basis of a user's operation;

execute a second selection for the content items that are to be the selection targets for the selected content group, on the basis of a user's operation;

give a selected content item determined by the second selection to the user;

accepting instruction(s), provided by the user, to use the selected content item within the video game that includes the virtual game space;

store, in the memory, a given status of each content item the content group for which the second selection is executed, such that the given selected content item is excluded from the selection targets in the content group;

determine some of the plurality of content groups as the selectable target groups by the first selection again when a predetermined condition is satisfied;

retain, in the memory, the given status of each content item in each content group regardless of which content groups are determined as the selectable target groups by the first selection; and based on all of the content items in at least one content group having a given status that excludes all of the content items in the least one content group as being selectable, update the given status of at least some of the content items in the at least one content group to be valid selection target again.

12. An information processing method for causing a computer to perform game processing, the information processing method comprising:

storing, in a memory, a plurality of content groups and a limited number of content items that are to be selection targets for each of the content groups, wherein each of the content items are in-game virtual content usable by a user in connection a video game that includes a virtual game space, wherein each of the plurality of content groups include different sets of the content items;

determining some of the plurality of content groups stored in the memory as selectable target groups by a first selection;

selecting at least one content group from among the selectable target groups on the basis of a user's operation;

executing a second selection for the content items that are to be the selection targets for the selected content group, on the basis of a user's operation;

giving a selected content item determined by the second selection to the user;

accepting instruction(s), provided by the user, to use the selected content item within the video game that includes the virtual game space;

storing, in the memory, a given status of each content item in the content group for which the second selection is executed, such that the given selected content item is excluded from the selection targets in the content group;

determining some of the plurality of content groups as the selectable target groups by the first selection again when a predetermined condition is satisfied;

retaining, in the memory, the given status of each content item in each content group regardless of which content groups are determined as the selectable target groups by the first selection; and based on all of the content items in at least one content group having a given status that excludes all of the content items in the least one content group as being selectable, updating the given status of at least some of the content items in the at least one content group to be valid selection target again.

13. The processing system of claim 1, wherein the content items include virtual items usable in the virtual game space, virtual characters or units that are usable in the virtual game space, images that are usable in connection with the video game, or virtual currency that is usable in connection with the virtual game space of the video game.

* * * * *